United States Patent [19]
Stridsberg

[11] Patent Number: 5,998,783
[45] Date of Patent: Dec. 7, 1999

[54] HEAT PROTECTED POSITION TRANSDUCER IN AN ELECTRIC MOTOR

[75] Inventor: Lennart Stridsberg, Enskede, Sweden

[73] Assignee: Stridsberg Innovation AB, Enskede, Sweden

[21] Appl. No.: 08/765,178

[22] PCT Filed: Jun. 1, 1995

[86] PCT No.: PCT/SE95/00633
§ 371 Date: Jan. 14, 1997
§ 102(e) Date: Jan. 14, 1997

[87] PCT Pub. No.: WO95/33180
PCT Pub. Date: Dec. 7, 1995

[30] Foreign Application Priority Data

| Jun. 1, 1994 | [SE] | Sweden | 9401889 |
| Oct. 10, 1994 | [SE] | Sweden | 9403428 |
| Feb. 17, 1995 | [SE] | Sweden | 9500598 |
| Apr. 1, 1995 | [SE] | Sweden | 9501235 |
| May 5, 1995 | [SE] | Sweden | 9501711 |
| May 5, 1995 | [SE] | Sweden | 9501712 |
| May 5, 1995 | [SE] | Sweden | 9501713 |

[51] Int. Cl.$^6$ ............................... H02P 8/00; A23B 7/00
[52] U.S. Cl. .................. 250/231.13; 318/565; 99/468
[58] Field of Search ................... 250/231.13–231.18; 318/565, 640; 310/68 R; 341/13, 31

[56] References Cited

U.S. PATENT DOCUMENTS

| 3,400,275 | 9/1968 | Trump . | |
| 4,554,451 | 11/1985 | Kirstein . | |
| 4,779,031 | 10/1988 | Arends et al. | 318/565 |
| 4,794,251 | 12/1988 | Scholian . | |
| 5,365,137 | 11/1994 | Richardson et al. | 310/258 |
| 5,456,164 | 10/1995 | Bang | 99/468 |
| 5,605,294 | 2/1997 | Migaki et al. | 242/18 R |

FOREIGN PATENT DOCUMENTS

3239108 C  4/1984  Germany .

Primary Examiner—Stephone Allen
Attorney, Agent, or Firm—Oblon, Spivak, McClelland, Maier & Neustadt, P.C.

[57] ABSTRACT

An encoder disc (101) of an optical position transducer is mounted on a short protruding part (102a) of a rotor (102) of an electric motor close to torque creating parts. One part of the optical system, normally the light emitter part (108, 115), is insertable between the rotor (102) and the encoder disc (108) after the insertion of the rotor-encoder disc assembly into the motor stator case (113). The optical incremental encoder signals are fed both to a moderate frequency digital counter that counts (4) counts per basic encoder period and to an AD converter that samples and digitises the primary encoder analog signals. A synchronising network ensures that the primary encoder digitised signal corresponds to the correct state of the digital counter. More than one decoder head can be used to compensate for the bearing play common in servo motors having varying axial loads. This construction gives a high speed resolution and fast speed response, is very compact and operates with modest demands on bearing precision.

16 Claims, 11 Drawing Sheets

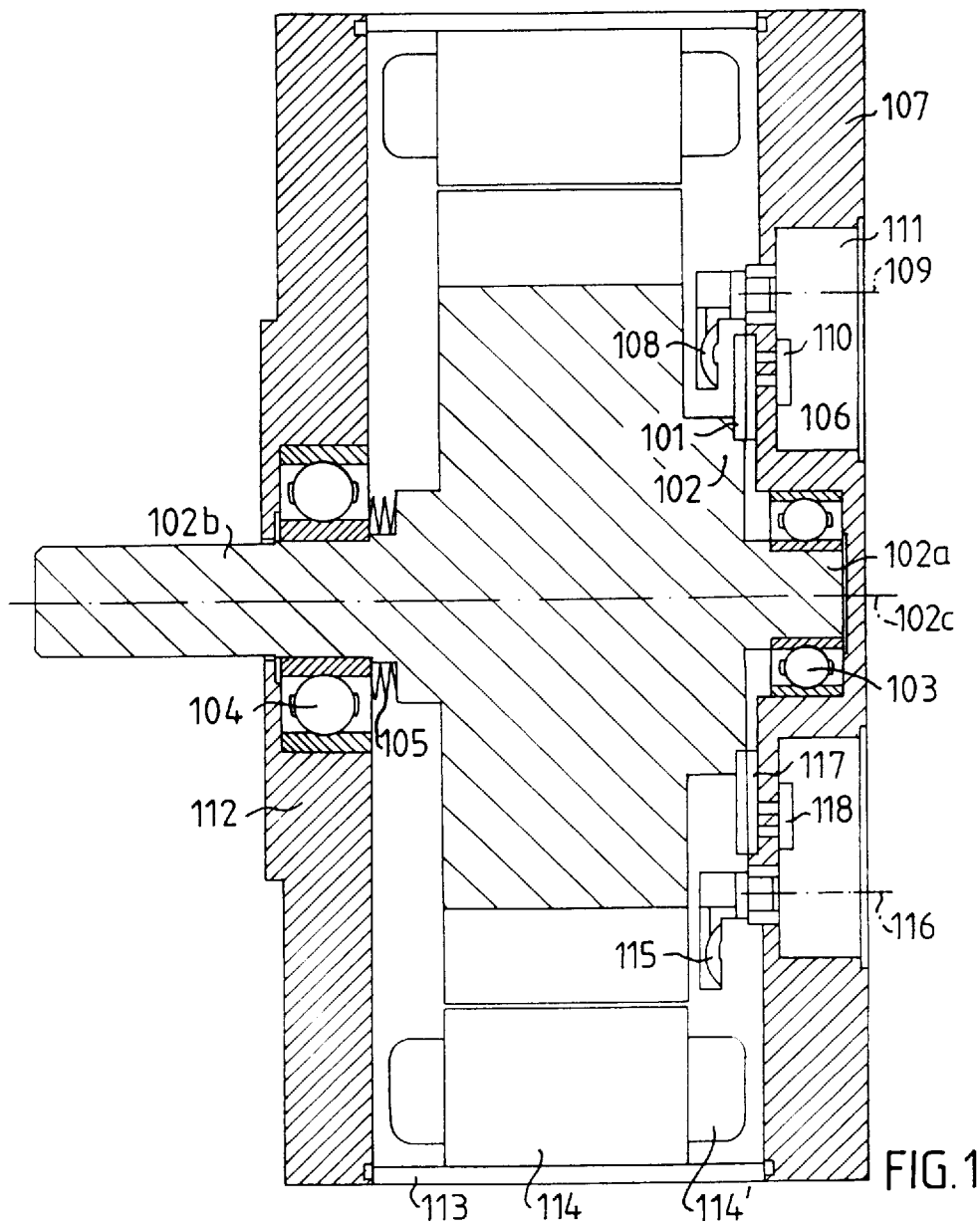
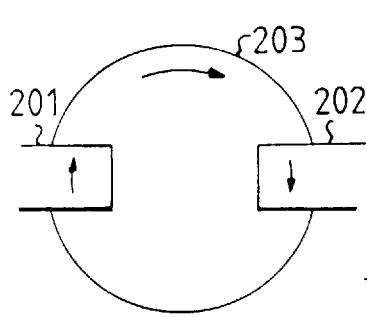
FIG.2
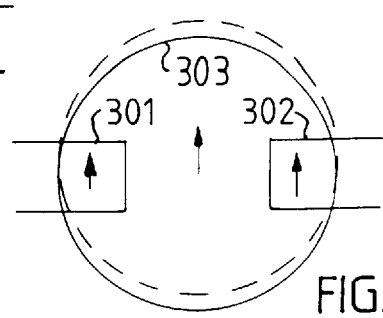
FIG.3
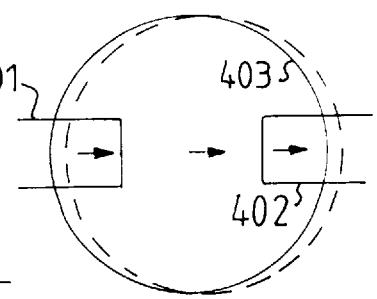
FIG.4

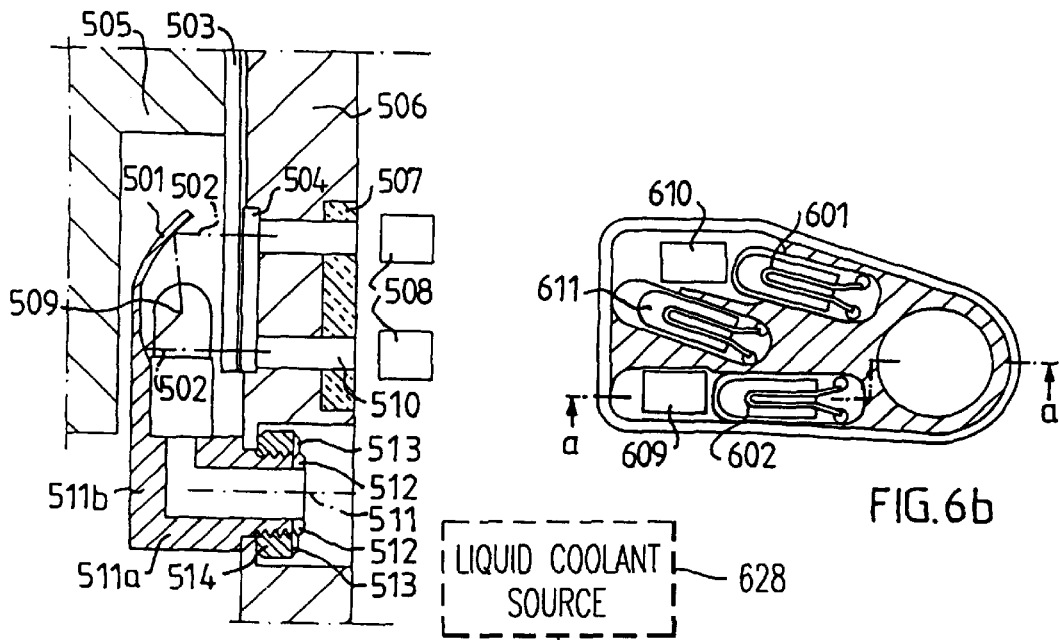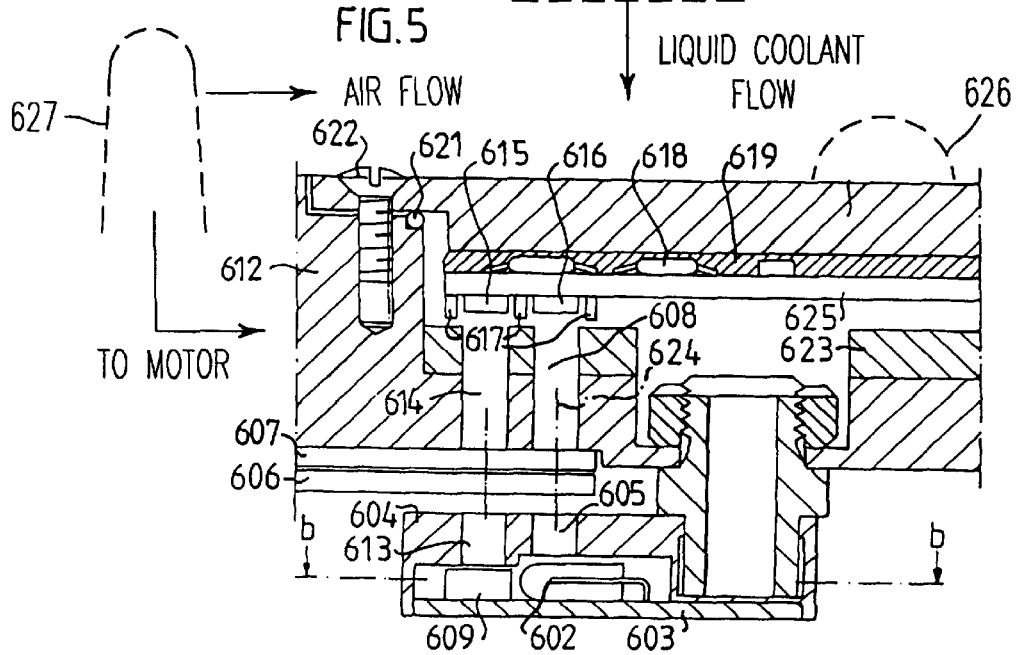

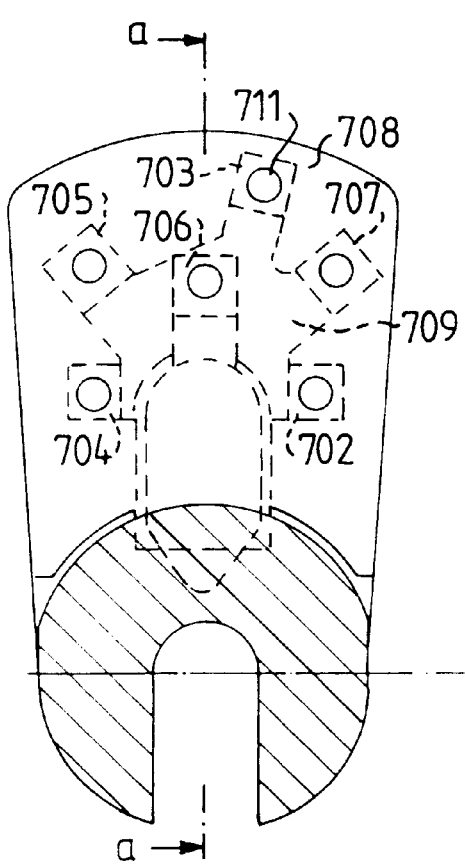
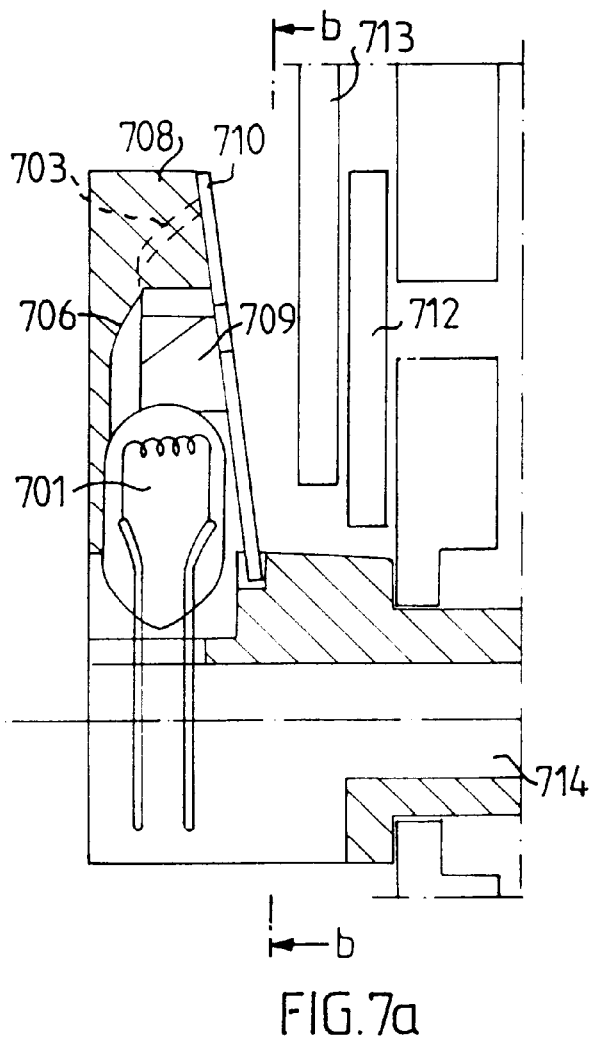
FIG. 7b
FIG. 7a

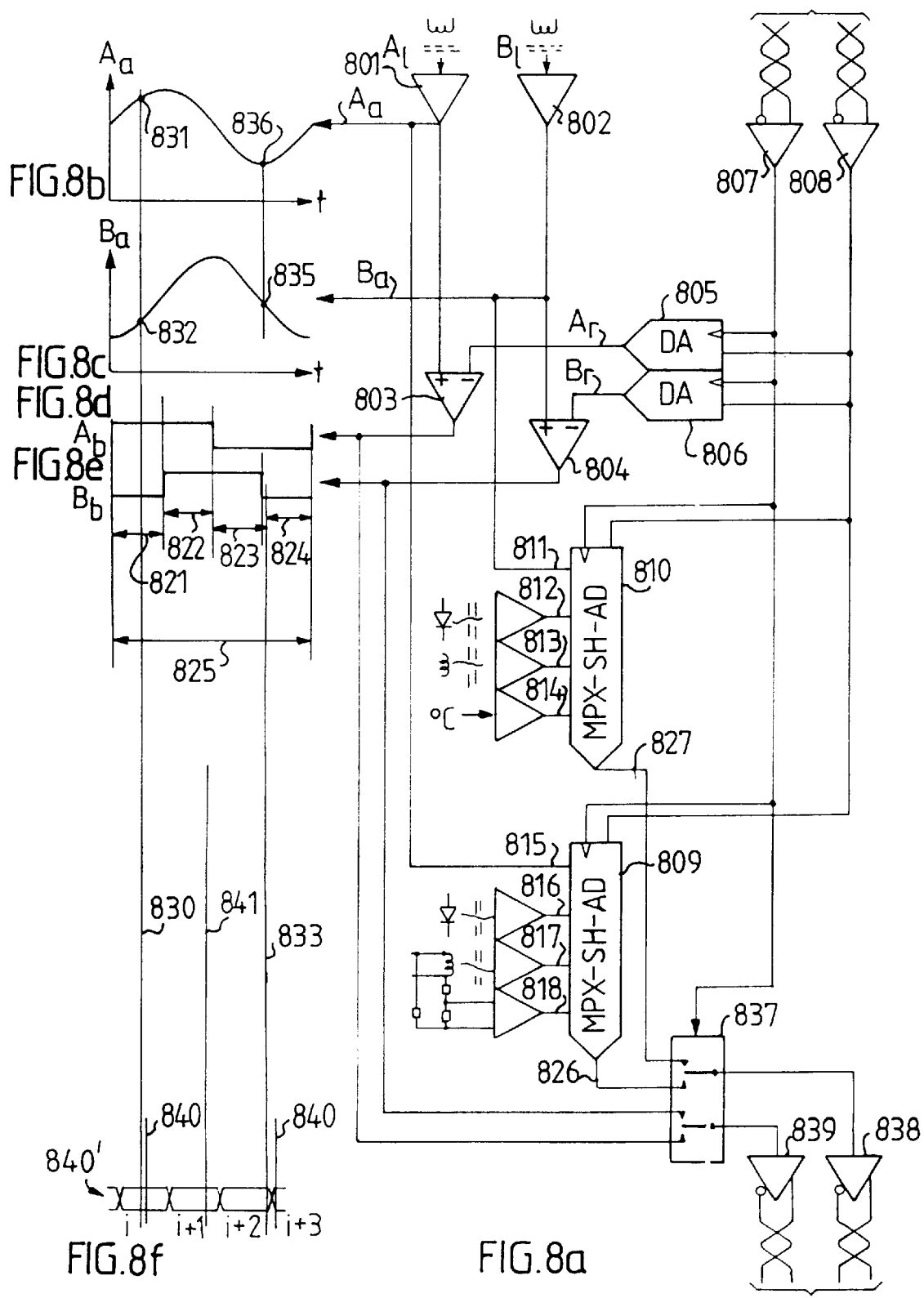

HEAT PROTECTED POSITION TRANSDUCER IN AN ELECTRIC MOTOR

TECHNICAL FIELD

The invention relates to position and/or velocity transducers for providing signals in regard of the position or velocity of a movable part, in particular of a rotor of an electric motor or generator.

BACKGROUND

There is an increasing need for stiff and compact servo motor systems. To be stiff, a servo motor system must be able to give a fast response to large and unexpected external torques. A fast response requires a very high resolution and a very low delay in the speed signal.

Analog electrodynamic tachometer generators offer a solution providing high resolution but it is difficult to build them so as to give a low delay. The generator adds a not negligible inertia to the rotor. The torsional stiffness in the mechanic coupling of the tachogenerator to the motor rotor is limited, and this gives a resonance frequency that limits the possible bandwidth of the servo motor control loop. Torsionally very stiff designs require mechanically very compact assemblies of the motor and the tacho generator. However, high resolution tacho generators should not be attached close to the motor as the stray flux from the motor windings might affect the output voltage of the tacho generator in the case where the two units are located too close to each other. Tachos also adds considerable cost and increase the size of the motor system.

Transducers that detect or sense rotary or linear motion by using at least two periodic primary signals having a phase difference in the order of magnitude of 90 degrees such as a resolver or an optical incremental encoder have been used for many decades of years. Resolvers and synchros can be made with very high resolutions but the costs of high resolution units are very high. The time delay from a motor speed change to the corresponding change of the detector output signal is not negligible since the torsional stiffness of mechanical coupling of the resolver to the motor rotor is limited, and this gives a resonance frequency that limits the possible bandwidth of the motor control loop. Torsionally very stiff designs require mechanically very compact assemblies of the motor and the resolver. High resolution resolvers should however not be mounted close to the motor as the stray flux from the motor windings might affect the output voltage of the resolver in the case where the two units are located too close to each other.

Incremental transducers are commonly used to give angular position information. By reading position data repetitively at known time intervals, an approximate value of the velocity can be obtained. The primary signal from optical incremental transducers are normally processed in one of two ways. In the first way the analog primary signals are compared to a reference level thus converting the basic sinus signal to a square wave binary signal that is fed to a counter chain that is readable from a computer.

In the second way, the signal is fed to a "multiplying" network that digitalizes the data based on the assumption that the analog signals have a constant amplitude and are sinusoidal. Such converters can for example convert one period of a sinusoidal input signal to 5 or 100 periods of the square wave output signals.

At low speeds, the limited resolution of a digital incremental encoder gives very high quantification errors in the speed estimate. With standard decoding electronics that gives 4 count pulses per period, even a 5000 line encoder gives only 20000 positions per turn. At a relatively high speed like 15 rpm and a test interval of 200 $\mu$s, the change in position is approximately 15/60*20000*0.0002=1 unit, which due to quantification errors can give either 0, 1 or 2 units as a speed estimate input signal to a control algorithm.

The resolution problem can be reduced by using encoders comprising more lines or by using interpolation circuits that generate for example 100 counts for every period of the basic encoder signal. Hardware interpolation requires a very high signal quality; the amplitude of the primary signals must be constant over one full turn and over time, and the shape of the primary signals must fit the assumptions for which the multiplier circuit has been designed, and they must do so over the full turn and over time. The linearity of these converters depends on the linearity of the primary sinus signals, and much work has been invested in different ways to obtain very linear output signals.

Both high line count encoders and encoders having a signal quality suitable for high factor interpolation put stringent demands on the light source and the mechanical properties of the encoder system. Even a 5000 line encoder normally operates with a 20 to 30 $\mu$m gap between encoder disc and receiver mask pattern. Incremental encoders suitable to give a high speed resolution therefore require encoder discs having separate bearings. Such arrangements add length and cost to the motor system.

PRIOR ART

Position and velocity transducers suitable for rotating parts are for instance disclosed in the patent documents DE-A1 27 11 593, DE-A1 35 27 128, DE-A1 38 13 754, DE-A1 39 14 557, DE-C2 39 01 546, U.S. Pat. No. 4,990, 767, U.S. Pat. No. 4,794,251, U.S. Pat. No. 4,580,047, U.S. Pat. No. 4,580,046, JP-A 57-169611, JP-A 63-6418.

The German patent document DE-C2 32 39 108 for Dr Johannes Heidenhain GmbH discloses a device having more than two signals of different phases, for example signals having phase differences of 0°, 30°, 60°, 90°, 120° and 150°. Improved two phase signals can be produced by multiplying these six primary signals by factors obtained from a fourier analysis of the shape of the six primary signals and by adding/subtracting these multiplied values to obtain two new signals having a phase difference of 90° to each other.

The European patent application EP-A1 0 541 827, also for Dr Johannes Heidenhain GmbH, discloses several arrangements for obtaining a more sinusoidal shape of the signals generated by an incremental encoder by having a pitch of the encoder mask transparent and opaque lines that is different from the pitch of the transparent and opaque lines of the encoder disc.

The company Max Stegmann GmbH has in 1994 introduced a system named SINCOS. The linearity of the sinus signals is claimed to be improved by using photodiodes in a triangular pattern. The pattern of the photodiodes replaces the encoder mask. To reduce the influence of contaminated encoder discs, of unavoidable deviations from an ideal, flat encoder disc surface and variations of the illumination LED due to temperature and age, the two output phase signals are sampled simultaneously at regular intervals. The sampled data are squared and added; the sum should give a constant value, as $k(\sin^2 \phi + \cos^2 \phi)$ should be k regardless of $\phi$. Deviations from the expected value k is interpreted as a fault in the light source and is fed back by adjusting the LED current.

Position detectors that gives a high resolution position information at discrete time intervals, for example once every 100 µs, are quite sufficient for a servo motor controller system that can use this information for controlling the motor torque to obtain the position/velocity profile required. Motor controllers are often used in more complex systems where other devices are dependent on obtaining precise position information using signal protocols and/or requiring data at times not synchronised with the update time of the position detector. There is therefore often a need for transforming periodically available high resolution data to a data stream compatible with the two phase signals obtained from a classical digital output position encoder. The European patent application EP-A1 0 414 953 discloses such a system which however has a very poor resolution of the two phase output signals.

SUMMARY

It is an object of the invention to provide a position/velocity transducer that has a very high resolution.

It is another object of the invention to provide a position/velocity transducer that has very small dimensions.

Another object of the invention is to provide a position/velocity transducer that can be integrated into a motor with very limited increase of the dimensions of the combined motor-encoder assembly compared to the size of the motor.

It is another object of the invention to provide a position/velocity transducer having a high resonance frequency in mechanical coupling of the motor rotor to the transducer system.

It is another object of the invention to provide a position/velocity transducer that permits a high precision.

It is another object of the invention to provide a position/velocity transducer that permits a high resolution even when mounted directly on the motor shaft and thus using the motor bearings instead of having own bearings.

It is another purpose of the invention to provide an encoder signal processing method that has a very high resolution and still permits the use of primary signals that have shapes that deviate from a sinusoidal shape with low distortion, that is have a very low intensity of upper harmonics.

It is another object of the invention to provide an encoder signal processing method that permits the use of primary signals that have amplitudes that vary depending on the angle of the encoder.

It is another object of the invention to provide an encoder signal processing method that permits a high resolution of position at specified points of time, for example once or twice for every position control loop in a servo system.

It is another object of the invention to provide an encoder signal processing method that permits a high precision even when using optical elements of limited quality.

It is another object of the invention to provide an encoder signal processing method that permits a high precision obtained from signals that vary in shape from one encoder to another in the same batch.

It is another object of the invention to provide a position/velocity transducer system that gives output signals compatible with the signals from a high quality digital output optical encoder.

It is another object of the invention to use time discrete position information to provide an output data stream that is compatible with data from an incremental encoder having a customer specified number of periods for a full turn.

It is another object of the invention is to use time discrete position information to provide an output data stream that is compatible with data from an incremental encoder having not only a customer specified integral number of periods for a full turn, but also permitting virtual incremental encoders having a non-integer number of periods per turn.

It is another object of the invention to use time discrete position information to provide an output data stream that is compatible with data from an incremental encoder having a customer specified zero pulse.

The objects above are achieved by the invention, the characteristics and features of which appear from the appended claims.

The invention provides a position and velocity transducer that has a high speed resolution and a fast speed response and that is very compact and operates with modest demands on the precision of the bearings. The transducer is based on an optical encoder. When assembled in motors, the encoder disc is assembled on a short protruding part of the rotor close to the torque creating parts. The transducer thus has a very rigid and space saving connection between encoder and motor rotor that permits a high resonance frequency of the mechanical system rotor/encoder. This arrangement is made possible by making one part of the optical system, normally the light emitter part, insertable between rotor and the encoder disc after the introduction of the rotor-encoder disc assembly into the motor stator case. The optical incremental encoder signals are fed both to a moderate frequency digital counter that counts 4 counts per basic encoder period and to an AD-converter that samples and digitises the primary encoder analog signals. A synchronising network ensures that the primary encoded digitised signals correspond to the correct state of the digital counter. The sampled and digitised analog signals are read by a processor using a linearisation algorithm which yields position information that locally is highly continuous thus permitting good speed estimation also for low speeds when a difference is calculated using position data representing rotor positions very close to each other. If so required, the transducer can be calibrated. The data from such a calibration permits a more precise algorithm that yields position information that is highly linear over the whole active range of the transducer. In order to give outputs compatible with presently commonly used multi-axis controllers, a digital logic network is used. This network is supplied with periodically calculated position and speed data for transforming these data to a high resolution signal that is compatible with that of a high quality optical incremental encoder. Optionally, more than one decoder head can be used to compensate for the bearing play common in servo motors having varying axial loads. In the case position information during power off is required, the light emitter part can be divided into filament or tungsten lamps or LED's that are operating continuously during power on and that illuminates the high resolution encoder, and LED devices that illuminate a very low resolution track and that in low power mode are pulsed on only at short intervals to permit tracking of slow motor movements while the main power is off. The low resolution track can advantageously also be used to obtain commutation information at power up of the motor.

A position encoder thus has one or several light sources and a movable encoder disc with at least one track having a multitude of adjacent fields of high and low transparency. An encoder mask is arranged having at least two openings, each opening having several adjacent fields of high and low transparency normally with the same pitch as the fields of the movable encoder disc but may have a pitch deviating from the pitch of the movable encoder disc in order to obtain better signal shape, the movable encoder disc and the encoder mask being separated by a very short distance. Further, light detectors are placed so that light from the light source basically must pass through both the encoder disc and an opening in the encoder mask to reach the light detector associated with that opening. The fields of the at least two mask openings are spaced apart relative each other in the normal way for incremental optical encoders so that the light transmitted through the two openings will be basically 90 degrees out of phase one to the other. The encoder mask and light detectors are assembled in or on the mechanical part(s) that connects one of the main motor bearings relative to the stator of the motor. The encoder light sources are assembled on a unit that in normal operation mode is mechanically locked to mechanical parts that during the normal operation of the motor are static relative to the mechanical part or parts that connect one of the main motor bearings relative to the stator of the motor. During the assembly of the motor the encoder light source unit is in another position so that the motor can be assembled without the light source touching the encoder disc. After the assembly of the motor, the light source can be moved to and secured in its normal operating position.

More specifically a position transducer is provided for determining the position of a part movable in relation to another part, typically a rotor of an electric machine movable in relation to a stator construction. The transducer comprises an encoder element attached to a first one of the parts, a light source attached to the other, the second one of the parts, and emitting light in paths, where the light is intersected by fields on the encoder element and a light detector attached to the second part and arranged to sense light along the path, which has been intersected by the encoder element. The light source and the light detector is arranged to be moved, in particular rotated, from one position outside an edge of the encoder to a position adjacent to a side of the encoder element, this making a compact layout of the rotor-stator possible.

The light source or the light detector will always comprise some spot or place for emitting or receiving light in the path. This spot or place can then be arranged on an L-shaped support structure having an arm which projects from a shaft. The shaft can be rotated in an opening in the second part and secured in a suitable position.

An encoder mask may be attached to the second part to cooperate with the encoder disc and it then, in the common way, has openings, through which light along the paths passes. To reduce stray light an opaque element, generally having flat shape, is placed between the light detector and the encoder mask in the light paths. It has an opening for each opening in the mask, so arranged that each such opening in the opaque element permits light to pass therethrough to a light detector associated with the corresponding opening in the mask. The openings in the opaque element should then have such a length in the direction of the light paths, that they block light from any opening except the opening associated with a certain light detector to reach that light detector. In particular the openings can be made in a plate or disc-shaped opaque material element, the thickness of which is sufficiently large or at least twice that of the width of the mask openings in a direction perpendicular to the longitudinal or radial direction of the fields of different transparency, these fields being very narrow for a high resolution.

At least walls of the openings in the opaque element may then be blackened to increase the absorption of light that hits the hole walls.

Electronic circuits of the transducer can be assembled with a low thermal impedance path to a heat conductive part that faces the ambient air, generally some front or rear part of the motor. The electronic circuits can also be assembled with a high thermal impedance path between the electronic circuits and a heat conductive part that have a low thermal impedance to heat generating parts of the motor. The electronic circuits of the transducer can further be assembled with a low thermal impedance path to a heat conductive part that is cooled by cooling fins located thereon. The electronic circuits can be assembled with a low thermal impedance path to a heat conductive part that is cooled by air from a fan mounted on the shaft of the rotor. The electronic circuits transducer can finally be assembled with a low thermal impedance path to a heat conductive part that is cooled by liquid cooling, channels therefor being arranged in the heat conductive part, e.g. in the front or rear part or shield of the motor.

The light source can comprise light elements for various uses, such as for continuous illumination and they can then be lamps of the filament type or resistance heated type. Also light elements for intermittent use can be arranged requiring a significantly smaller electric power for their operation than the continuous illumination lamps. A control device will then active the intermittent light elements only when the mains supply is disrupted or for producing light pulses for special purposes.

The transducer can comprise at least two detector devices, each one reading one encoder disc track with a low resolution. These two devices may then be located and arranged so that they have a substantial phase difference. These two devices are arranged to be, during a low power mode, energised with a low duty cycle, and therefore these two devices are connected to a signal processing device, in particular a counter or a microprocessor, which arranged to interpret the possible state changes of the two devices in order to sense movements of the encoder disc.

The at least two detector devices can be arranged to read two encoder disc tracks with the same low resolution. The low resolution track or tracks can also be used for commutation control of the electric motor.

There may be in the transducer at least two zero pulse patterns. The low resolution track detector device signals concurrent with the occurrence of a valid zero pulse are different for the different zero pulse patterns, thereby enabling signal interpreting devices to identify which of the zero pulse patterns that caused the zero pulse signal.

The particular arrangement can also be described by saying that a partially transparent encoder disc is assembled on the rotor shaft between the torque producing air gap of the motor and one of the rotor bearings and that a light source is placed on one side of the encoder disc and light detector devices are placed on the opposite side of the encoder disc, this producing a most compact construction.

The rotor may then comprise a main rotor part, so that the air gap is located at some surface thereof, e.g. an exterior cylindrical surface. Then there is a side surface of the main rotor part which is connected to the first surface and here the encoder disc is mounted, inside a bearing for the rotor. A step can be made in the side surface for attaching the encoder disc at the edge portion of the step, when the encoder disc has an annular shape. Such a mounting will achieve that a marginal circumferential portion of the encoder is freely available, located at distance from the side surface and here the encoder tracks are located to be read by a detector.

The position transducer can also be mounted in a motor in another way, where the motor comprises in the conventional way a rotor having a rotor main part and axles projection therefrom and two rotor bearings located at each side of the rotor main part for rotatably mounting the axles. The encoder disc can be made with a fairly small outer diameter and is rigidly attached to a first one of the rotor axles, for instance at an end surface thereof. The outer diameter can then be smaller than an inner diameter of the bearing which supports this axle allowing that the rotor axle with the encoder disc attached thereto can be inserted through this bearing or that this bearing with an attached side plate or shield plate is moved over and around the axle and the encoder disc when assembling the motor and the position transducer.

In the same manner as above, the first axle can comprise a step for mounting the encoder disc. The encoder disc is then attached to a surface at this step for obtaining that a marginal circumferential portion of the encoder disc is located at distance from surfaces of the rotor and in particular of the first axle.

In another aspect, a partially transparent encoder disc is assembled on a rotor shaft between a torque producing air gap of the motor and one of the rotor bearings, light sources are placed on one side of the encoder disc and light detector devices are placed on the opposite side of the encoder disc as above. Further, there are at least two light detectors groups reading a high resolution track, where the detectors in each of these groups are designed to read signals from the high resolution track with a phase difference of at least 60 degrees. These at least two detector groups are basically symmetrically oriented around the motor axis, and position misreadings caused by radial movements of the encoder disc can then be cancelled out or eliminated by adding the positions calculated from the signals from the different light detectors or averaging the signals.

There may in particular be only two light detector groups and then these two groups should be placed essentially on opposite sides of the motor axis, thus approximately 180 degrees apart.

There may also be three light detector groups and these may then be essentially symmetrically oriented around the motor axis, thus approximately 120 degrees apart.

The electronic processing of the signals from the detector heads may be designed to give an indication having a high accuracy. It presupposes that two analog signals are provided from the detectors, these signals having a considerable phase difference, preferably 90 degrees. The processor circuits comprise an essentially asynchronous low resolution digital conversion circuit receiving the analog signals to give at least two and preferably four low resolution states for each period of the analog signals, a device arranged to decode the transitions from one of low resolution states to an adjacent state into count up or count down commands, a counter connected to the decoding device, the state of the counter being incremented for each count up command and the state of the counter being decremented for each count down command, an essentially synchronous high resolution analog to digital conversion system that samples the analog signals at regular intervals, and a synchronisation device that samples the state of the counter at a time so selected that the state of the counter represents the values of the analog signals at a time close to the times at which the analog signal were sampled by the high resolution analog to digital conversion systems. Finally there are data processing means to convert the high resolution analog data to position information.

In a position encoder there can then generally be provided a transducer such as the system light source-encoder track-light detector and it produces at least one analog signal which varies periodically with the position of an encoding element, which as above for instance is a an encoder disc having periodically repeated fields having some physically detectable property different from the regions between the fields. A counting circuit receives the analog signal and determines therefrom a value which is stored and represents the position of the encoding element as the number of periods of the encoding element from an initial or a reference position. An analog to digital converter receives also the analog signal for producing a digital value being a sample of the analog signal. Evaluation means determine the position of the encoder element by combining the digital data from the AD-converter with the value stored the counting circuit. The digital data will provide a position value essentially within one encoder period, thus accomplishing together the value stored in the counting circuit an accurate indication of the position.

In particular the transducer can comprise an incremental encoder producing two analog signals that each one varies in a periodic manner with the position of the encoding element. Further the analog signals should have a considerable phase difference, such as essentially 90° or at least in the range 60–120°.

The data processing means may also be described as comprising first processing means for conversion of the high resolution analog to digital conversion data to information on the position within a basic encoder period and second processing means for combining the information on the position with an encoder period given by the processed high resolution data with the information on the position as expressed as a multitude of encoder periods given by the sampled counter data.

Further the fine indications of the position provided by the position transducer can calibrated and then the transducer is assumed generally to comprise a modulating device such as the track on an encoder disc, some means for producing at least one analog signal varying periodically with the position of the modulating device and an analog to digital conversion system for converting the analog signal into digital information at repeated times, e.g. at regularly repeated times. The digital information will then generally represent the position of the modulating device within at least one half period of the modulating device, the periods thus being for instance the periods of the fields of the encoder track, that is the distance between centres of adjacent fields. Digital computing means can then process the digital information for transforming it into digital values representing digitally a sinus wave or curve. Therefor the digital computing means comprise means for storing information available on deviations of the periodic variation of the analog signal from a sinusoidal shape which has a constant amplitude for all the periods of the modulating device.

The information stored in the storage means of the digital computing means may include information on variations of amplitude of the periodically varying analog signal for different whole periods of the movement of the modulating device. The information stored in the storage means of the digital computing means may also include information on the systematic deviation of the periodically varying analog signal from a sinusoidal shape.

The modulating device can be an optical encoder disc or bar having a periodically varying reflection. It can also be a disc or bar having periodically varying magnetisation and the magnetic flux in the vicinity of the disc or can be recorded by a hall sensors for producing the analog signal.

The transducer can also use magnetic flux recorded by a hall sensor situated in a magnetic circuit, the flux of which is driven by a permanent magnet and the flux intensity of which depends on a movable ferromagnetic object. This ferromagnetic object can then be designed so that the magnetic permeability of the magnetic circuit including the permanent magnet and the hall sensor varies periodically with the position of the movable ferromagnetic object.

An incremental position encoder system can also be designed for providing special output signals suitable for motor control and the system then generally comprises some primary position indication means which provide signals representing a position of some object such as an encoder disc. First data processing means, e.g. a microprocessor, working at a medium or moderate speed calculate high resolution position information from the signals of the indication means at regularly repeated calculation times and they also estimate the change in position from the most recent calculation time to the next calculation time. There are also second data processing means working at a high frequency such as an adder connected to suitable registers for adding repeatedly at a high frequency a value derived from the estimated change in position to a value stored in a register, such as a hardware register, or an accumulator, where this value is selected so that it represents an estimated position.

The second data processing means can instead be arranged to update the register, which can also be a counter or memory location, at regularly repeated times, where these updating times are given by a high frequency divide-by-n counter that divides a high frequency clock signal by a value which is derived from the estimated change in position.

The value of the estimated position stored in the register etc. can be stored in second register at suitable times, so that this value stored in the second register can be accessed by or transferred to various information requesting devices through a data bus, a local network, a serial link controller or other data transfer means.

There is advantageously also a two phase encoder simulation device which is connected to the register or accumulator etc. holding the estimated position. The register etc. may then be arranged to output a signal to the simulation device when the value stored or hold therein passes a predetermined modulo limit such as the maximum integer number which can be represented in the register, that is the signal is then a carry signal, so that the simulation device changes, on receiving the signal, states on its outputs or of its output signals. The limit should be chosen to either fit a resolution required by information requesting devices or to respect limitations given by information requesting devices, in particular a maximum counter counting range or a maximum permissible encoder signal frequency. Also the high frequency of the adding operation can be adjusted for this fit or for respecting the limitations.

The case using a signal representing some carry can be described in the following way. The least significant bits of the register or memory location storing or holding the estimated position value is a register or memory location that will obtain overflow or underflow several times for each full range movement of the position transducer. Each such overflow or underflow event will then cause a change of the state of the outputs of the two phase encoder signal simulation device.

In the case where the high speed second data processing means updates an estimated position at intervals given by a high frequency divide-by-n counter that divides a high frequency clock with a value derived from the estimated change in position, the updating of the estimated position can be performed caused by a change of the state of the outputs of the two phase encoder signal simulation device.

The first data processing means may advantageously obtain information permitting a comparison of the position according to the primary position indication means and the data representing the estimated position and then information can be provided which is suitable for correction of differences between the position according to the primary position indication means and the data representing the estimated position.

BRIEF DESCRIPTION OF THE DRAWINGS

The invention will now be described with reference to specific embodiments which are not intended to limit the invention, the scope and characteristics of which are set out in the appended claims, the embodiments being illustrated in the accompanying drawings in which:

FIG. 1 is a sectional view of an encoder disc assembled on a motor rotor and an insertable light emitter device mounted at a side of the motor, FIG. 2 is a schematic front view of a dual detection head encoder in normal mode operation where the disc is rotating, FIG. 3 is a schematic front view similar to that of FIG. 2 showing the same dual detection head encoder in an unwanted mode of operation, where the disc 303 is moving vertically, FIG. 4 is a schematic front view similar to that of FIG. 2 showing the same dual detection head encoder in another unwanted mode of operation, where the disc 403 is moving horizontally, FIG. 5 is a fragmentary, sectional view of a position transducer mounted at a motor and including a filament type light source having a paraboloidic reflector, FIG. 6a is a fragmentary, sectional view of position transducer mounted on motor comprising a light source using several small filament lamps and auxiliary LED light sources, FIG. 6b is a sectional view of the light source portion of the transducer of FIG. 6a taken along the line b—b, FIG. 7a is partly schematic, fragmentary sectional view of a position transducer mounted on a motor and including a filament type light source having reflectors which have the shapes of small parts of a paraboloidic surface, FIG. 7b is fiagmentary sectional view of the position transducer of FIG. 7a taken along the line b—b, FIG. 8a is a block diagram of a portion of an embodiment of the signal processing electronic circuits that is located close to a position encoder, FIGS. 8b and 8c are waveform diagrams as functions of time of two analog signals obtained from position transducers, FIGS. 8d and 8e are waveform diagrams as functions of time of level-discriminated signals obtained from the signals of FIGS. 8b and 8c, FIG. 8f is a diagram as function of time illustrating the count cycles and sampling times of the electronic circuits of FIG. 8a, FIG. 9 is a block diagram of a servo motor system including a controller and signal processing electronic circuits that are located close to the controller.

DETAILED DESCRIPTION

Figure 9:
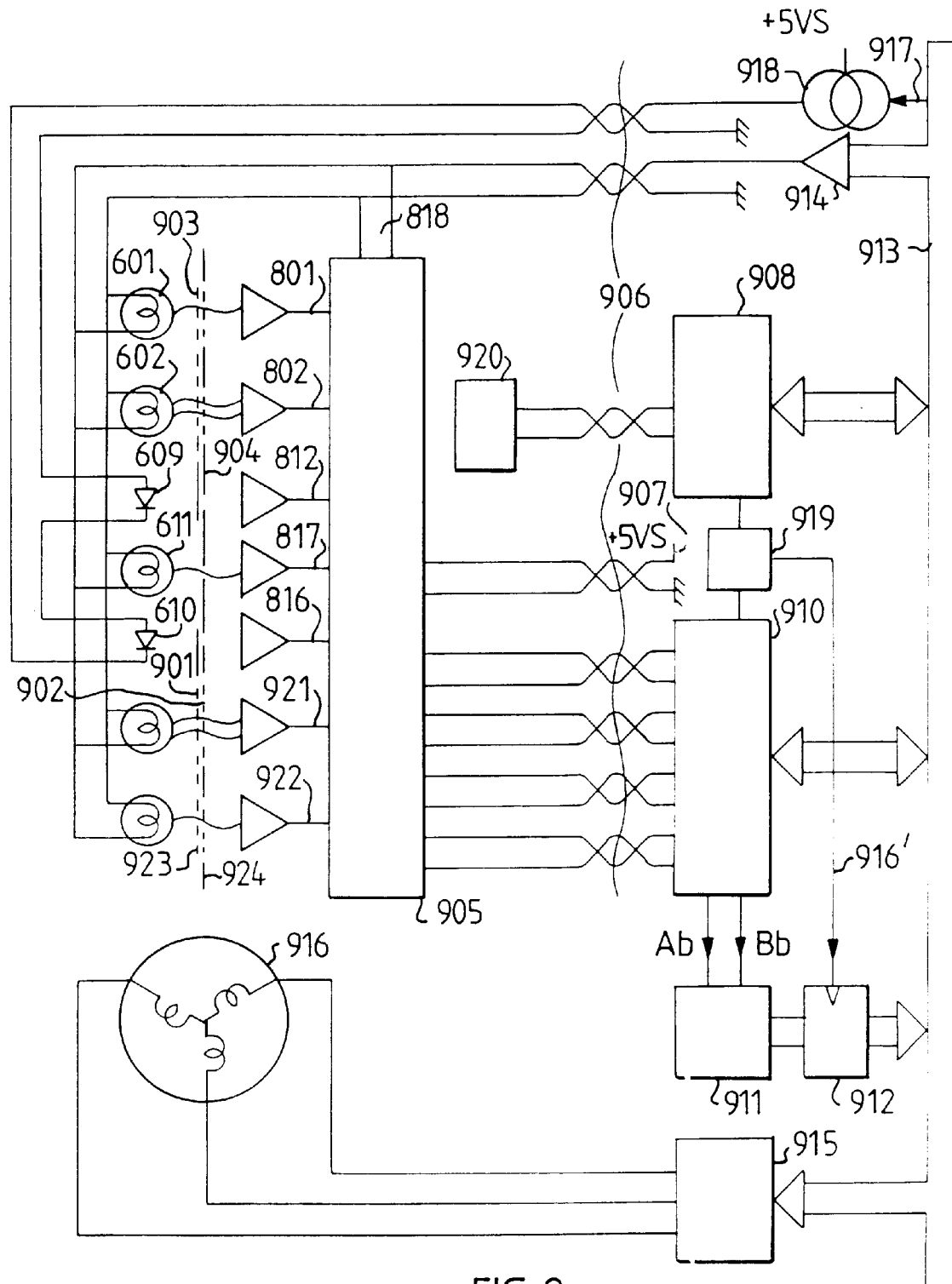

In FIG. 1 a fragmentary view is shown of an encoder disc 101 assembled on a motor rotor 102 having a main part which is integral with short stub axles 102a, 102b and movable around an axis 102c. The rotor is supported by two antifriction bearings 103 and 104, typically roller bearings, located at each side thereof and the bearings are preloaded by Belleville or cup springs 105 in relation to the rotor. The spring preload forces the rotor 102 against the rear bearing 103. An encoder mask 106 is attached to a non-rotating rear shield 107 intended to be attached to some frame part and also supporting the rear bearing 103. Recesses for the mask 106 and the rear bearing 103 are both made in the rear shield 107. The rotor 102 has a basically cylindrical shape, the diameter thereof being reduced in two steps at the rear side for producing an annular space for the light elements to be described below and for positioning and attachment of the encoder disc 101. The encoder disc 101 has annular shape and is secured at its interior marginal portion at the edge of the step of the rotor. As long as the preload from the springs 105 is maintained, the distance from the encoder disc 101 to the mask 106 will have very small variations.

An illumination device 108 can thus be inserted into the cavity generated by one of the mentioned steps between the rotor 102 and the encoder disc 101 by a rotation of the illumination device around an axis 109. A light detector 110 can be mounted in a recess 111 accessible from the outside of the motor, from the rear side of the rear shield 107. In this recess, the axis 109 for turning the illumination device 108 is also accessible. This permits insertion of the rotor into a stator assembly consisting of a front shield 112, a stator case 113 and a stator 114 while the rear shield 107 is still not mounted. When the rotor is positioned in its place, the rear shield 107 can be inserted with the illumination device 108 turned away from the motor axis 102c, so that it does not engage with the encoder disc 101. This is illustrated by a second illumination device 115, that is turned 180 degrees from its operating position. After the rear shield has been mounted, this second illumination device 115 is turned back an angle of 180 degrees about its axis 116 to point in a direction towards the motor axis 102c and is locked into the position required for the illumination 115 device to operate properly. It can for example be arranged by turning the device to a stop position where some part of the device rests against a stop pin (not shown) attached the rear shield 107.

Conventional separate incremental encoders have a shaft and a bearing system that are connected to the device to be monitored, for example, an electric motor, by a coupling that isolates the encoder shaft and its bearings from variations in radial or axial forces. This is not the case with a motor as shown in FIG. 1. Large and pulsating radial forces will in many applications affect the front end 102b of the motor shaft, where a driven device is to be connected, eventually creating unwanted radial movements of the encoder disc 101 in relation to the mask 106. Therefore, a velocity value is obtained depending not only on the rotation of the encoder disc but also, if the disc is moved radially, on a mechanical play in the bearings or a deflection of the motor shaft due to radial loads. In the case of high gain high bandwidth servo systems, it can easily cause violent resonance phenomena.

The effect can however be eliminated by having a second detection head or system, the second detection system comprising a second mask like 117 and a second light detector 118.

In FIG. 2 a schematic front view of a dual detection head encoder is shown. Each of the two detector heads 201 and 202 includes at least two decoding channels some 90 degrees offset from each other.

In the desired mode of operation, the disc 203 rotates. The small arrows in the heads 201 and 202 both indicate the detection of a clockwise rotation. A simple averaging of the position values from the two encoders should then give a satisfactory result.

In FIG. 3 the same dual detection head encoder is shown in an undesired mode of operation, where the disc 303 is moving vertically. The small arrows in the heads 301 and 302 now indicate the detection of a clockwise rotation for head 301 but a counterclockwise rotation for head 302. In the case of a single head encoder only having one encoder head 301, the result should have been an erroneous indication of a clockwise movement. A simple averaging of the position data from the two encoder heads should however give a satisfactory result; in this case head 301 would record a clockwise movement that would be cancelled out by an equally large counterclockwise movement recorded by encoder head 302.

In FIG. 4 the same dual detection head encoder is shown in another undesired mode of operation, where the disc 403 is moving horizontally. The small arrows in the heads 401 and 402 now indicate no detection of any rotation for either head 40 1 nor head 402. As any non-rotating disk movement can be divided in a vertical component as shown in FIG. 3 and one horizontal component as shown in FIG. 4, all non-rotating disk movements will create a net signal that is basically zero in the dual head system, when an averaging is made of the signals from the two heads.

FIG. 5 is sectional view of a detail of a position transducer having a common rotating encoder disc 503 attached to the rotor 505. As the inertia of the encoder disc 503 is small and as it is mounted rigidly to the motor rotor with an extremely short and stable large diameter shaft consisting of the rotor step portion 505, the resonance frequency of the mechanical system rotor/encoder can be kept very high.

The combination of a short distance between the encoder disc and the rotor and the high temperature inside the motor will in most applications exclude the common light sources used in high resolution encoders. A tungsten filament lamp, bulb or incandescent lamp with a collimator lens will be too long. Separate LED's for every information channel are in most cases excluded as the temperature rise due to the power dissipation of the light emitting diodes added to the high ambient temperature close to the rotor will reach levels that are unacceptable for presently available LED materials.

The use of lamps for the light channels required during normal operation permits the encoder light source to operate in temperatures up to the permissible storage temperature of the LED's. Present available magnets and insulation materials permits the interior of an electric motor to reach 150 degrees Celsius or higher, while the permitted storage temperature for presently available LED's are limited to 125 degrees or 150 degrees Celsius. The possible output power of the LED's in a surrounding at 150 degrees C. is therefore zero, and also much lower inside motor temperatures puts severe restrictions on the output power of the LED's.

The light source illustrated in the sectional view of FIG. 5 solves this problem by using a tungsten filament lamp 509 and a basically paraboloidic reflector 501 that directs light beams 502 through the encoder disc 503 and the stationary mask disc 504. The transmitted light is directed to the detectors indicated at 508. To reduce the temperature for the detectors 508, they are mounted on the outer side of a structure 506, which for example may be the motor rear shield 107 depicted in FIG. 1, that to some extent shields the heat from the motor windings, which are indicated at 114' in FIG. 1. The outer surface of the structure 506 should be considerable less hot than the interior of the motor and in particular around the reflector 501. A thermal insulating layer 507 can be added on the exterior, rear side of the structure 506, to further isolate the detectors 508 from the motor heat. Holes 510 in the structure 506 permit light reflected by the reflector 501 to reach the detectors 508.

After assembly of the motor, the light source can, as has been described with reference to FIG. 1, be rotated around an axis 511. The light source thus comprises a short shaft 511a having a exterior thread at its one end, the other end being connected to a part 511b extending radially from the shaft 511b. The shaft passes through a hole in the side structure 506. The filament lamp 509 and the reflector 501 are attached to the laterally extending part 511b, the reflector 501 for instance being made as an integrated part thereof such as a properly shaped surface coated with some light reflecting material. The extending part 511b can turned to its operating position by turning a tool like a screw-driver that is operated against a track 512 in the end of the short shaft 511a. A nut 514 is screwed onto the part of the shaft 511a protruding through the hole and locks the shaft and thus the whole light source element in the correct position, where the filament lamp 509 is located on one side of the encoder disc 503, by tightening the nut 514, for instance by a suitable key or a tool that operates on a track 513 in the exterior side of the nut 514.

In FIGS. 6a and 6b sectional views are shown illustrating another embodiment of a light source for the transducer. The light for the signals that are required for continuous operation are given by two miniature filament lamps 601 and 602 and is reflected by small flat mirrors, not shown, for example made as pads on a circuit board 603. The light from lamp 602 passes through an opening 605 in the illumination device coves 604. It then passes a high resolution track on the encoder disk 606 and the encoder mask 607 and an opening 608 in a rear structure as above to finally reach a light detector 616. The lamps 601 and 602 illuminate two high resolution encoder phases.

The embodiment shown refers to an encoder attached to a brushless DC motor, such motors for instance being disclosed in the International Patent Application No. PCT/SE91/00683. It is for such transducers common to add additional channels on the encoder disk to control the commutation of the current to the windings in the motor. Two of the three commutation signals required are illuminated by LED's 609 and 610. The light used for the zero pulse channel and the third commutation signal comes from a common miniature lamp 611.

Assuming that a zero pulse has been detected and that the counter system does not loose count pulses, the commutation signals to the motor can be derived from the high resolution track counter chain. The commutation signals are then only necessary from main power up to when motor controller computer has been able to move the rotor to the first zero pulse.

The LED light sources 609 and 610 permits a limited tracking of the position during main power off. By having the commutator channel LED's powered on for some microsecond every 10 milliseconds during main power off, and using these signals as a low resolution incremental encoder, the controller system can track the movements enforced on the shaft during power off. The maximum permissible speed is low, but in most applications the movements forced on servo motors during power off are slow. Using low power light sensing electronics, CMOS control and counters and with low duty cycle for the LED's, the total supply current for such a back-up power position tracer is in the order of one or a few mA, thus permitting weeks of operation on the current available from a small NiCd-battery pack. After main power on, the position is known to within one commutation sector. By having several zero pulses and using auxiliary information like the commutation sectors to distinguish between the different zero pulses, full position information is established after only moving a fraction of a turn. For example, normal three-phase rectangular commutation has six unique combinations. Using this information, six zero pulses can be used; the state of the commutation channels at the time of the zero pulse makes it possible to identify which of the six zero pulses that gave the signal.

As an alternative to a single encoder disc track using three binary light detectors, a single encoder disc track having a transparency that during one turn increases continuously or stepwise for one whole turn and then abruptly decreases can be used. Such a track can be read with one or two light detectors able to send intensity information to the control computer. Such devices can also during a low power mode be energised with a low duty cycle. If the encoder disc moves during low power mode, the changes in transparency detected by this one device can be used to record movements of the encoder disc. The embodiment illustrated in FIGS. 6a and 6b has only a few openings that permits light to leave the light source.

The opening 605 permits light from the lamp 602 to possibly pass the encoder disc 606 and the encoder mask 607 to reach the light detector 616 through a hole 608 in the rear shield 612. The opening 613 permits light from the LED 609 to possibly pass the encoder disc 606 and the encoder mask 607 to reach a light detector 615 through the hole 614. In all there are six hole pairs, two for the high resolution channels, three for the commutation and one for the zero pulse. Thus, four remaining hole pairs are not visible in the figures. The cover 604 reduces stray light around the encoder that otherwise could reduce the dark-to light contrast seen by the light detectors.

The hole pairs like 605 and 608 act as substitutes for condenser lenses. The very limited space in the encoder light source device and the limited precision of the position of the tungsten filament in miniature lamps will make conventional condensers very expensive.

The proper operation of the incremental optical encoders requires light that is essentially perpendicular to the surface of the encoder disc like 606 and the encoder mask like 607. Light that deviates much from the direction perpendicular to the encoder disc surface will reduce the contrast of the encoder. The movable encoder disc like 606 has at least one track with a multitude of adjacent fields of high and low transparency. Light that passes through one of the fields that have a high transparency will pass to the air-gap between the encoder disc 606 and the encoder mask 607. Most of the surface of the encoder mask has a low transparency, but there is at least two openings (as shown in FIGS. 6*a* and 6*b* these two openings face the lamps 601 and 602). These openings have several adjacent fields of high and low transparency, normally with the same pitch as the fields of the movable encoder disc. Depending on the position of the movable disc relative to the mask, the light that has passed the transparent fields in the encoder disk will be more or less absorbed by low transparent fields in the encoder mask opening. The at least two mask openings are normally being spaced apart relatively to each other so that the light transmitted through the two openings will be basically 90 degrees out of phase to each other.

If the light would be perfectly perpendicular to the encoder disc and encoder mask surfaces (and if the wave aspect of light could be ignored), the amount of light that would reach a light detector like 616 behind the encoder mask would only depend of the degree in which the light passing through the encoder disc would hit a low or high transparency field in the encoder mask opening. The distance between the movable encoder disc and the encoder mask would be irrelevant. In most encoders, the distance between the encoder disc 606 and mask 607 is far from negligible when compared to the distance between the high transparency fields of the high resolution track. Light that has moderate deviations from being perpendicular against the encoder disc surface can therefore pass highly transparent fields of both the encoder disc and the encoder mask even when the encoder disk is in a position that would cancel light that is perpendicular to the encoder disc surface. Such light will reduce the contrast between maximum and minimum light transmitted through an encoder mask opening.

The purpose of a condenser is therefore to capture as much of the lamp or LED light as possible and to arrange it to a set of basically parallel light rays. In the embodiment shown in FIGS. 6*a* and 6*b*, the hole pairs like 605 and 608 will have a similar effect. Light from lamp 602 that is not almost parallel to the axis 624 will hit the black walls of either hole 605 or hole 608, and most of this unwanted light will therefore be absorbed. The frame 617 will reduce the leakage of light from one light detector to adjacent detectors.

The high temperatures inside the motor puts severe restrictions on the output power of the LED's. This does however not pose a problem for the design according to FIGS. 6*a* and 6*b*, as the LED's are switched off during normal operation and only are operated during power-off and start-up.

The high temperatures used in some motor applications can however affect the semiconductor devices used for the detection of light. It is therefore desirable that the encoder electronic circuits are isolated from the hot motor stator and get a good thermal connection to the relatively cold ambient air. Such an arrangement is shown in FIG. 6*a*. A sheet 623 with poor heat conductivity, i.e. a thermally isolating sheet, is attached to a side, as seen in the Figure the bottom side, of the encoder signal processing cavity. The electronic circuits are located on a circuit pattern board 625 attached at an opposite side of the cavity, the light detectors 615 and 616 being mounted at the side of the board facing the large space of the cavity. Most heat generating components like the one indicated at 618 do not face the large space of the cavity but are placed on the rear or upper, as seen in the Figure, side of the board and are there almost in contact with the inner side of the metal case lid 620, the other side of which is in contact with the ambient air. The thermal connection is further increased by a thermally conductive but electrically isolating compound 619 filing the small space between the rear or upper side of the circuit board 625 and the inner side of the metal lid 620. The metal lid 620 is kept at a small distance from the hot rear shield 612 by an O-ring 621. The only metallic thermal path from the rear shield 612 to the metal lid 620 is provided by screws 622 for attachment of the lid 620 to the rear shield.

The thermal impedance to ambient air can further be reduced by adding cooling fins (note dotted line fin 626, for example) to the outer surface of the metal lid 620 and/or by adding a fan (note dotted line fan blade 627, for example) on the rear shield. If the fan is placed at the centre of the rear shield, the ambient air will first hit the metal lid 620 and then reach the outer parts of the rear shield where the stator heat is conducted into the shield. Such an arrangement will ensure a temperature of the encoder electronic circuits that is close to that of the ambient air. Liquid coolant from a source such as shown by dotted line source 628 of FIG. 6*a* can also be used.

In FIG. 7 yet another embodiment of a light source for a position transducer is illustrated. The light for the signals is given by a lamp 701 and is reflected by six small highly reflective inclined surfaces or mirrors 702–707. These surfaces are interior surfaces of a moulded part 708. The part has an internal cavity that can be white or some other bright reflective colour of the material of part 708 or be a reflective coating on the part. The cavity 709 is covered by a non-transparent lid 710 in which holes like 711 permits the light to exit in positions corresponding to openings in the encoder mask 712. The outside surfaces of the parts 708 and 709 are preferably light absorbing to limit the amount of not wanted stray light to flow in the space between the lid 710 and the encoder disc 713. The wires to the lamp can be connected to the encoder electronics through a channel 714.

As is obvious for those skilled in the art, the short light source can be designed in many other ways than that shown in FIGS. 5, 6*a*, 6*b*, 7*a* and 7*b*.

The design according to FIG. 5 can have two or three LED's inserted to permit the same power off tracing as that of FIGS. 6*a* and 6*b*.

The light sources as described have been inserted into the slot between the rotor and the encoder disc by rotation around an axis parallel to the motor axis. The light source can alternatively be put in place by a linear movement basically perpendicular to the motor axis.

Unlike most optical incremental encoders, the light source embodiments of FIGS. 5, 6*a*, 6*b*, 7*a* and 7*b* all lack condenser lenses. As is obvious for one skilled in the art, the light sources can be modified to include condenser lenses. Such lenses can be added in many ways. One way is inserting lenses in the openings like 605 and 613. Other alternatives is to place a moulded transparent plastic device with a set of integrated lenses on top of the lid 604 or on top of the lid 710; in such a case it can be advantageous to let a small cylindrical section of each lens body penetrate the topmost part of the holes like 605 and 613 to ensure a correct placement of the lens device.

The light source embodiments of FIGS. 5, 6a, 6b, 7a and 7b all use tungsten lamps. The light sources can however be modified to only use LED's. One way to replace the lamps 601 and 602 by LED's and to replace lamp 611 by two LED's. The use of LED's will be more attractive if high temperature LED's would become available or if a more light sensitive detectors are used; if the power dissipation of the LED's can be kept down to a few milliamperes and the thermal resistance to ambient could be kept reasonably low for example by a metal design of lid 604, the temperature rise of the LED could be restricted to a few degrees thus permitting operations up to temperatures well above 100 degrees of the light source heat sink 612. Miniature LED packages comprising an integrated lens for each LED offers another possibility.

The light sources can operate with other light sources than tungsten lamps or LED's, for example with electroluminescent surface devices or semiconductor lasers. The light direction devices can regardless of the type of primary light source be based on dark tunnel devices like 613–614, condenser lenses, a combination thereof or for inherent parallel light sources like semiconductor laser, be eliminated.

In FIG. 8a a block diagram is illustrated of an embodiment of the signal processing system suitable to be located adjacent to the motor or in a cavity in the motor rear shield like 111 of FIG. 1. The embodiment permits fully digital data transfer. Signal-waveform diagrams as function time are shown in FIGS. 8b–8f.

The primary encoder light signals $A_1$ and $B_1$ (1 for light) are connected to two light-to-voltage transducers 801 and 802. These transducers, which may be photodiode-amplifier combinations, give analog voltage outputs $A_a$ and $B_a$ (a for analog), the time diagrams of which are shown in FIGS. 8b and 8c respectively.

The analog values are fed to two comparators 803 and 804. The comparator outputs $A_b$ and $B_b$ (b for binary) defines four logic states illustrated in the waveform-time-diagrams of FIGS. 8d and 8e as 821, 822, 823 and 824 for each basic encoder period 825 by comparing the two primary signals A and B to some reference voltages $A_r$ and $B_r$. Depending on the characteristics of the $A_a$ and $B_a$ signals, these two levels $A_r$ and $B_r$ may be generated by two DA-converters 805 and 806, be a fix reference voltage or may be connected to signal ground.

A clock signal from the motor controller is received by a circuit 807, and a serial data line communicating command information from the motor controller is received by a circuit 808. The output signals of the circuits 807 and 808 are interpreted as command clock and command data by the two reference levels DA's 805 and 806 and by two analog data conversions systems/multiplexers 809 and 810. The systems 809 and 810 include a serial command interpreter that identifies commands received from the receiver circuit 808 to select a requested analog input channel like 811 using an internal analog multiplexer, to sample the selected input at a time precisely defined by the command data obtained via the receiver circuit 808 from the motor controller and the clock signal obtained via the receiver circuit 807 from the motor controller and to transmit serial data corresponding to the selected analog input to the output terminals 826 and 827 of the conversion systems/multiplexers 809 and 810 respectively.

During the time indicated as 830, see the diagram of FIG. 8f, the converter 809 samples the signal on its input 815, i. e. the signal $A_a$ in point 831 of FIG. 8b and the converter 810 samples the signal on its input 811, i. e. the signal $B_a$ in point 832 of FIG. 8c. Data from the two AD-systems 809, 810 will be sent to a data compression circuit 837. To avoid irrelevant complexities in FIG. 8a, the data compressor chosen is a simple two channel dual input digital multiplexer controlled by the clock signal forwarded by the clock receiver circuit 807. When the clock signal is high, a line driver circuit 838 sends data from output terminal 827 of the conversion system 810 to the motor controller; when the clock signal is low, the line driver 838 sends instead data from output terminal 826 of the conversion system/multiplexer 809 to the motor controller. In a similar way, when the clock signal is high, a second line driver circuit 839 sends data output from the comparator 804 for the B-channel signal to the motor controller and when the clock signal is low, this line driver 839 sends data from the comparator 803 for the A-channel to the motor controller.

The comparator data transmitted by line driver 839 will be decoded in the motor controller and will be fed to a counter chain, not shown. The values in this counter is illustrated as graph 840 in the diagram of FIG. 8f. In the first time shown in the Figure, the counter state is "i". When the comparator 804 for the B-channel changes state, (at the transition from time segment 821 to 822 in FIGS. 8d and 8e), the data sent to the motor controller from the line driver circuit 839 will change, and the counter will after some delay change from state "i" to "i+1".

To obtain a high resolution position information, the value of this internal counter is latched at time 840. The delay from the analog sampling time 830 to the counter latching time 840 is intended to cover time lost due to delays in the comparators 803 and 804, delays in the data compressor 837 etc.

The control computer, not shown, can read the position at time 830 as two parts. One part is read through the counter data latched at time 840, and corresponds to a conventional standard decoding electronics that gives 4 count pulses per encoder period 825. This can be regarded as an integer part of the position. The other part is read from the AD-converters 809, 810. This gives the AD-converter values of the basic analog signals from the encoder. After a suitable digital signal processing of this AD-data to adjust for bias, scale factors and the normally non-linear characteristics of the analog output from the encoder (it can often be approximated as a sinus), these data provide what can be regarded as the fractional part of the position. Due to delays in data compression, cabling, etc., the analog signal sampled might represent a fraction value from the AD converter that is slightly outside the interval 0.0000 to 0.9999. The actual position is obtained by adding this value (in the range slightly below zero to slightly above +1) to the integer value read by latching the counter state at time 840.

The basically simultaneous latching of counter data and basic analog signals $A_a$ and $B_a$ assures that the fraction value obtained from the processing of AD-data corresponds to the simultaneous integer value from the counter.

This construction permits very high angular resolutions. A 5000 line encoder followed by an AD having a 13 bit net resolution (after scaling and compensation for the non-linear slope) of a quarter period like 821 gives a total resolution of more than 27 bits on a single turn rotation (5000*4*213). This angular resolution corresponds to resolving an earth surface distance of 0.25 meters seen from the centre of the our planet. Using a 200 $\mu$s interval between two position readings, a 15 rpm rotation will in this case give a speed value of 15/60*$2^{27}$*0.0002 or 8000 ±1 units compared to 1

±1 in the conventional use of the same 5000 line encoder. Such an embodiment of the invention represents 3000 rpm as a speed 800,000 times the basic speed resolution.

If the AD-conversion and multiplexing systems 809 and 810 are faster than the position update interval required by the motor controller, an extra AD-conversion at time 841, see FIG. 8*f*, can be performed before the next reading of analog position signals at time 833. These spare conversions can be used to monitor motor temperature through a line 814, monitor lamp voltage through line 818 or to check data from the three commutation channels 812, 816 or 817 or the zero pulse channel 813, these signals and connection lines all being inputs to the AD-conversion-sampling-multiplexing systems 809 and 810.

In the case where two encoder heads are used, as illustrated in FIGS. 1–4, two additional DA's like 806 and 807, additional amplifiers and additional multiplexer inputs like 811 and 815 are sufficient for handling the additional encoder head. No extra cabling from transducer to the motor controller would be required.

If we assume that low power CMOS devices are used, the encoder electric and electronic circuits can be constructed having a negligible current consumption during the time periods when the lamps and LED's are off and in the case where clock and data lines are static. This permits a simple low power low resolution position tracking by enabling the two LED's driving signals 812 and 816 for some microsecond synchronised with a data and clock burst that results in the sampling of the input signals on lines 812 and 816 at the end of the LED power pulse.

As is obvious for one skilled in the art, the data capture and data compression can be performed in many other ways than that illustrated in the diagram of FIG. 8*a*.

The fundamentally simultaneous latching of the basic analog signals $A_a$ and $B_a$ can be made by using two single monolithic sampling AD-converters/multiplexers 809, 810 as shown, a single monolithic sampling dual channel AD-converter designed for stereo recordings or by two Sample Hold circuits, the outputs of which are fed to a multiplexer that feeds in turn a single AD-converter which is arranged to convert the two output signals one after the other. The Sample Hold functions can be eliminated if the AD-converters used are fast enough (flash converters). The data compression, the circuit 837, can be eliminated, by using separate chip select receivers for each AD-converter or DA-converter and having separate drivers for the signals $A_b$, $B_b$ and the two AD-converted signals 826 and 827 output of the conversion/multiplexing systems 809, 810 respectively. In the other extreme case, a sophisticated data compression can run its own clock and mix all output data and clock to a self clocking single channel data stream that possibly can be transmitted on an optical fibre.

In FIG. 9 a block diagram is illustrated of a servo motor system including a transducer circuit like the one described with reference to FIG. 8*a* and a controller. The left part of these Figure refers to the parts in or adjacent to the motor. In the following, reference number starting with 6 or 8 refers to items described above with reference to FIGS. 6*a* and 6*b* or 8*a*; 601 is for example a tungsten filament lamp illuminating one of the high resolution encoder channels and 801 is the light-to-voltage transducer, sensor or detector shown at the top of FIG. 8*a*.

Figure 10:
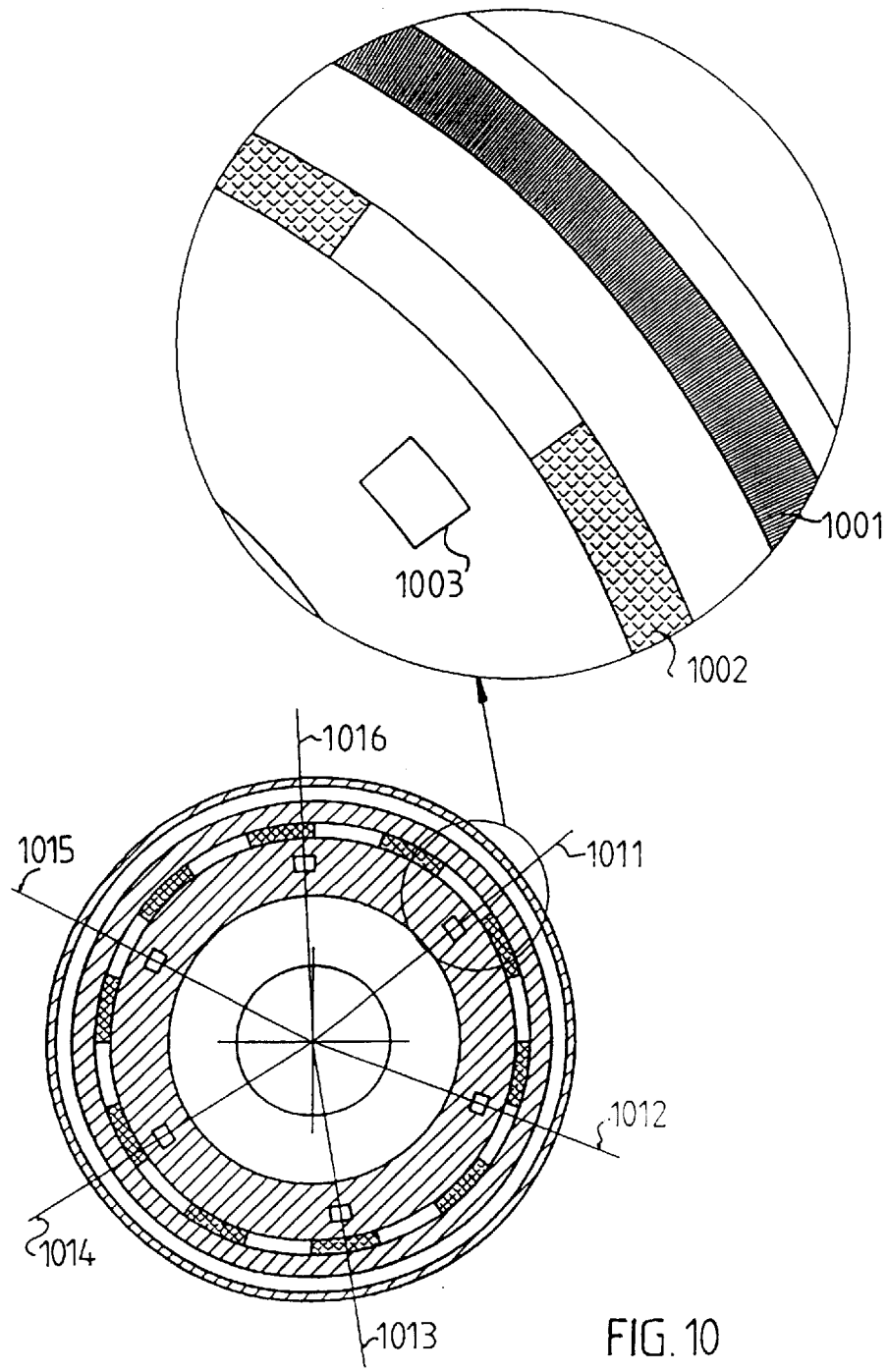
FIG. 10 is a front view of an encoder disc, where one portion is illustrated in a large scale.

The low resolution encoder track illustrated schematically at 901, see also the description of FIG. 10, item 1002, is engraved on the moving encoder disc like 503. One or two of the three holes in the mask shown at 902, see also FIG. 5, the mask disc 504, will always be covered by the non-transparent part of the low resolution track 901. The moving high resolution track indicated at 903, compare item 1001 of FIG. 10, will together with the encoder mask 904 generate two conventional analog encoder signals from the transducer units 801 and 802.

The signal processing unit 905 comprises principally the circuits depicted in FIG. 8*a* and has thus already been described. Power to this device is delivered through a (shielded) transducer cable 906 from a battery supported power supply 907, that also powers a microprocessor 908, a transducer data transfer device 910, a position counter 911 and (even though not necessary) a position latch 912.

If two encoder heads as is illustrated in FIGS. 2, 3 and 4 are required, the two extra high resolution detectors 921 and 922 for the extra head can be connected similarly to the light detectors 801 and 802. The item 923 is the same high resolution encoder disc as is indicated at 903 but in another position as shown in FIG. 3. The high resolution encoder masks for the two encoder heads are illustrated at 904 and 924.

Calibration data as will described below can be stored in a memory 920.

The transducer data transfer device 910 stores commands from the microprocessor 908 and transfer these commands to the clock and data receivers 807, 808 of FIG. 8*a*, that via the receiver circuits cause the signal processing unit 905 to sample the analog encoder signals $A_a$ $A_b$ from the transducers 801, 802 at regular intervals like the times 830 and 833 of FIG. 8*f*.

The transducer data transfer device 910 will also receive data from the driver circuit 839 of the data processing unit and unpack the data stream to recover the state of the signals output from the two comparators 803 and 804. These recovered states will act as input signals to the position counter 911, that after some delays will count up or down depending on the state changes of the signals from the comparators 803, 804. The counting operation of the counter 911 is therefore basically asynchronous in relation to the periodic sampling of the analog values of $A_a$ and $B_a$ at times like 830 and 833 made by the AD-converters/multiplexers 809, 810. The state of the counter 911 is latched into latch 912 at times like 840 of FIG. 8*f* that are synchronised with the sampling times like 830 in the manner described above with reference to FIG. 8*a*.

Further, the transducer data transfer device 910 will receive data from the driver circuit 838 and unpack the data stream to recover data from the two multichannel AD-converters 810 and 809. These recovered data will after some delay be stored in some register inside the data transfer device 910. The microprocessor 908 may preferably obtain a high priority interrupt and should then read the AD-data that are accessible to the microprocessor 908 through a data bus 913. The state of the position counter 911 at the time like 830 when the received data was captured is also available on the data bus 913 through the latch 912.

The counter chain 911 and its latch 912 are required because of the comparatively very short time per period of the primary signal. Most resolver systems used at high speeds have only one period per turn. A dedicated microprocessor can therefore count the periods in software; at 8000 rpm one resolver period per turn gives 7.5 ms per period, which is easily handled as a low priority real time task for any microprocessor that is used in modern high performance servo systems. For an optical encoder of the kind described herein, even a 1000 period optical disk will give 7.5 μs per period at 8000 rpm. The basic control algorithms will take several tens of microseconds for any currently available microprocessor in the cost range normally found in a servo controller, and to use a software routine to update a position counter and to keep record of the analog sampling events in relation to this position counter at such rates is beyond the scope of such processors.

The microprocessor 908 can control the torque of the motor in the conventional way by a three-phase switch network 915 that controls the currents to the motor windings illustrated at 916, compare the International patent application PCT/SE91/00683.

The system permits advanced compensation against long term drift of transducer parameters. The microprocessor can periodically check the lamp voltage by the signal on input line 818 and can if necessary adjust the voltage to the desired value by sending commands to the lamp supply 914. The actual values of the primary analog signals $A_a$ and $B_a$ are continuously monitored by the AD's. Suitable software can detect and correct against changes in transducer system parameters. Lower signals due to aged lamps can be compensated by sending adjusted level commands to the two DA-converters 805 and 806 that define the turn over point of the comparators 803 and 804. A transducer calibration run can be implemented, for example at power on or when so commanded in a periodic maintenance routine. In such a calibration run, the conformity of the primary encoder signals can be checked and correction data can be adjusted. In this way it is possible to compensate for differences in the primary waveform shape for different sectors of one rotation turn.

As is obvious for one skilled in the art, the basically simultaneous latching of the digital counter data can also be implemented in many ways. The implementation of the timing generator inside 910 that sends the command sequence received by AD converters 809 and 810 and that issues the latch command 916 can be made in so many different ways that the author of this text finds it unlikely that even two of the designs made by five independent designers should look very similar to each other.

The input stages of the counter 911 that create count up/down pulses from the comparators 803, 804 converting the four comparator combinations to up down pulses might have to temporarily block the up down pulses if the following counter chain is not fast enough to ensure that all stages in the up down counter will be changed between the normal regular time slot when the up down pulses are generated and the time slot when a signal like that one on a line 916' will latch the state of the counter chain inside the counter 911 into a latch like 912. The two lowest or least significant bits can be obtained from the counting of up down pulses, but can also be obtained by a logic network processing the signals representing the states of comparators 803 and 804. The position counter 911 can contain all bits required for the total position range required. Alternatively, it can contain a limited number of the lower bits, and as a third alternative it may be reset between each latching of data into the output latch like 912 and the next following count up/down pulse, thus only giving the change in the integer position value since the previous latching; in both latter cases software is used to update the higher bits of the position data.

Many signal processors include serial input registers and interrupt timing generators. The AD-data register of the transducer data transfer device 910 and part of the timing network can therefore be implemented using standard signal processor hardware.

The zero pulse detector is not shown in FIG. 9. The low resolution channel track 901 has three detectors 609–611. Two of these are illuminated by LED's 609, 610. The microprocessor 910 can switch the LED current generator 918 on and off by a signal on a control line 917 providing a very low duty cycle during main power off to permit tracking of the rotation movement caused by external forces during main power off as described above with reference to FIGS. 6a and 6b.

In FIG. 10 a front view of an encoder disc like that shown at 503, FIG. 5, is shown. The high resolution track indicated at 1001 is also shown at 903 in FIG. 9. The low resolution track 1002 can be used for main power off position tracking and for commutation purposes. The embodiment shown of the low resolution track has 10 periods suitable for a motor having 20 magnetic poles. The disc has six different zero pulse patterns like 1003. These six patterns are placed fairly but not entirely regularly around the disc. The radial lines 1011–1016 passing through the zero pulse pattern centres intersect the low resolution track at six different phase angles. For example, line 1011 intersects a transparent sector at the clockwise end, line 1012 intersects a transparent sector at the counter-clockwise end and line 1015 intersects a transparent sector at the centre. By reading the value of the commutation signals, the microprocessor can identify that one of the six zero pules patterns that gives a peak signal to a zero pulse light detector producing a signal like the one on line 813 in FIG. 8a.

Figure 11:
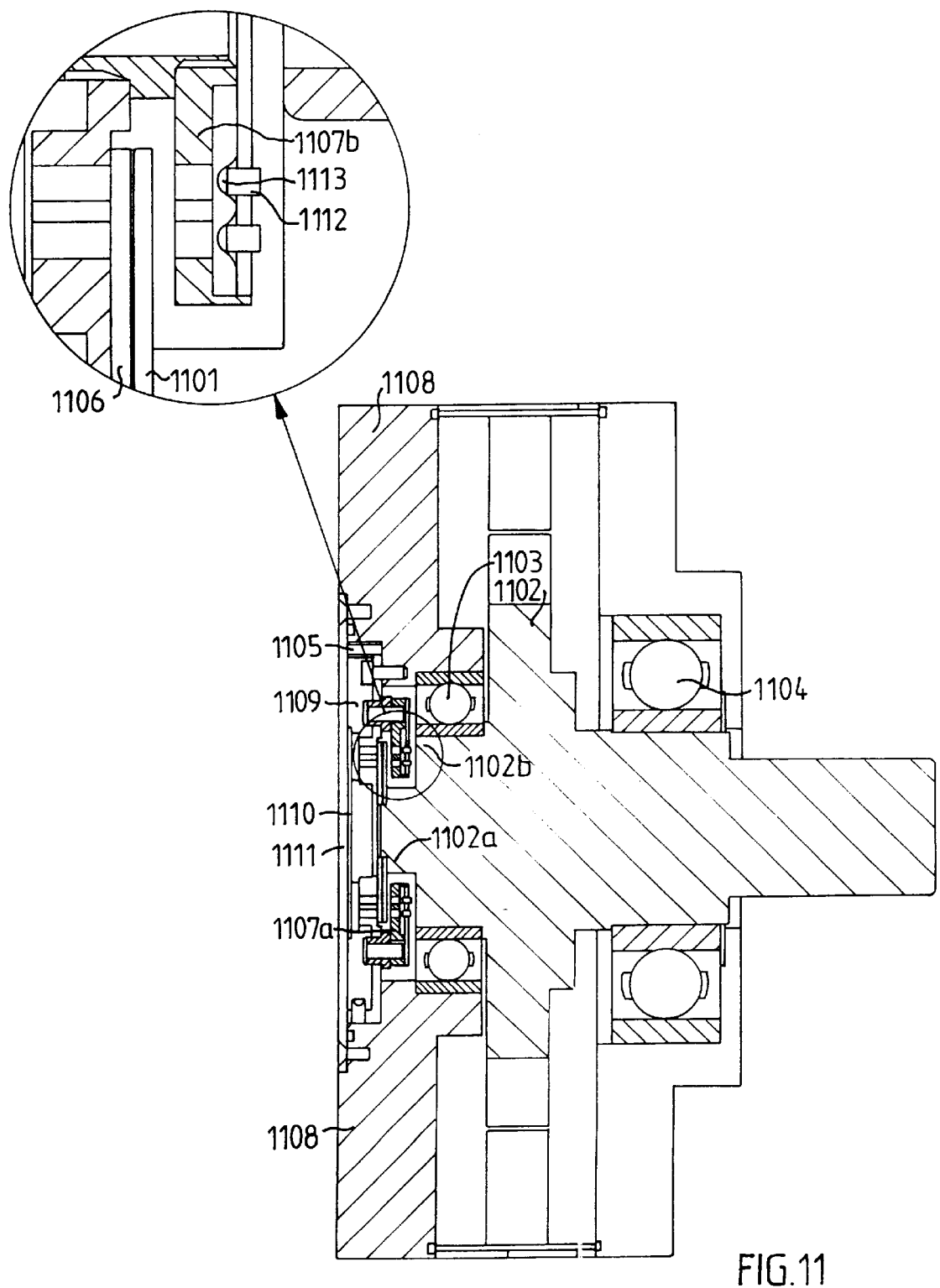
FIG. 11 is a sectional view of an encoder disk assembled on a motor rotor and an insertable light emitter device mounted at a side of the motor.

In FIG. 11 a sectional view is shown, as seen in a section through the rotational axis, of an encoder disc 1101 assembled on a motor rotor 1102 integrated with short stub axles 1102a and 1102b. The rotor is supported by two antifriction bearings 1103 and 1104 located at each side thereof. An encoder mask 1106 is attached to a non-rotating insert 1105 that is rigidly attached to the rear shield 1108, that supports the rear bearing 1103. The rotor 1102 has a basically disc-formed shape, the diameter thereof being reduced, at the rear side, in a first step 1102b to fit the bearing 1103 and in a second step 1102a for producing an annular space for the light elements 1107a and 1107 b.

An illumination device 1107 can thus be inserted into the cavity generated by the second step between the rotor 1102 and the encoder disc 1101 by a rotation of the illumination device around an axis 1109. The printed circuit board comprising the electronic components for the processing of the light signals is mounted directly to the lid 1111.

In the enlarged part of FIG. 11 an illumination device is illustrated having LED's as the light source. Each LED is inserted in a package 1112 having an integrated lens 1113 acting as a condenser lens.

In prior art very high resolution encoders much effort has been made to primary analog signals having constant amplitudes (for example for all periods around the full turn of a rotary encoder) and with a shape that is very close to a sinus signal with a very low distortion. With such signals, the position within a period of the primary signal can be found using "multiplication" hardware or software that uses the function arcsin or similar functions the values of which are stored in look-up tables.

Several conditions have to be fulfilled if such signals will be obtained, and some of these conditions will increase the production cost of the encoder system and/or put restrictions on the size of the encoder elements. It would therefore be advantageous to provide a signal processing system which can accept other signal shapes. Such a system could advantageously also accept signal shapes which can be permitted to vary somewhat from one encoder to another in the same batch without reducing the resolution or precision of the device.

This is accomplished with a calibration procedure. The encoder can after final assembly be turned slowly with a constant speed or it can be mechanically coupled to a very precise calibration transducer and then rotated. The primary signals can be read for a large number of positions close to each other, and data thus obtained can be processed to give suitable coefficients to calibration algorithms that can be executed very rapidly during normal system operation.

The choice of algorithms depends on the characteristics of the transducer type, its mechanical tolerances etc. The complexity of the algorithms, for example the number of terms required, depends on the required linearity and the properties of the primary signals.

The coefficients obtained from this calibration routine can be stored in the servo controller. It is however preferable to store the transducer type and its coefficients in the transducer, for example using a non volatile memory. This information can be downloaded to the controller after power up. Storage in the transducer ensures that all transducers always are processed using the correct algorithm and coefficients.

The linearisation of primary encoder data can be accomplished by using non-utilized capacity in the signal processor which is often available in present art servo controllers.

The method to obtain a high resolution or precision from basic analog signal deviating from a sinusoidal shape is applicable to all transducers that detects rotary or linear motion by using at least two periodic primary signals with a phase difference in the order of 90 degrees, and optical incremental encoders is one common such transducer type.

The principle will now be illustrated by two algorithms. The description below is only one possible embodiment of the basic principle of a mathematical linearisation procedure applied to non-sinusoidal primary analog signals.

The embodiment which will be described divides the processing of the primary signals in two steps. The first step is to correct for mechanical or optical deficiencies that causes the bias or amplitude of the primary signals to change along the measurement path. The second step is to calculate the position within one primary signal period based on two primary signals that deviates from sinus shape and/or have phase differences different from 90°. Such signals are not well suited to prior art "multiplication" hardware or software routines.

Figure 12A:
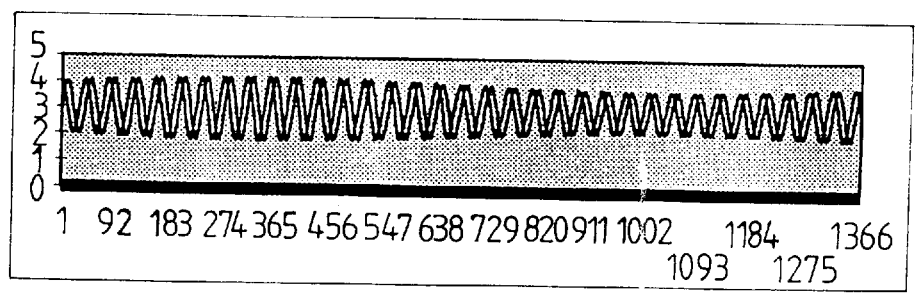
FIG. 12a is a diagram of two primary encoder signals as function of time or motor shaft angle, the signal amplitudes varying along the turn of the encoder disc.

In FIG. 12a a picture of a primary encoder signal is illustrated, the amplitude of which varies over one turn. Such deviations can for example be obtained for wobbling encoder discs, i.e. discs where the optical plane of the disc is not sufficiently perpendicular to the encoder rotation axis, thus giving different distances from encoder disc to encoder mask for different rotational angles of the encoder.

If we assume that the encoder system has means to identify a specific index position for every whole turn (for example a zero pulse), the processing unit can easily correct for the wobbling deviation illustrated by the diagram of FIG. 12a. Using the known encoder axis angle $\phi$ in relation to some fixed reference angle, a sinus look-up table and appropriately chosen coefficients $k_1, \ldots, k_8$, an algorithm like $$A_{out}=A_{in}(1+k_1 \sin(\phi+k_2)+k_3 \sin(2\phi+k_4)+k_5 \sin(3\phi+k_6)+k_7 \sin(4\phi+k_8))$$

gives a normalised signal $A_{out}$ from the primary signal $A_{in}$. If wobbling is the dominant error source, the same coefficients $k_1, \ldots, k_8$ can be used also for channel B. If the wobbling disc surface is flat, the three last terms and the coefficients $k_3$–$k_8$ can be omitted.

Figures 12B, 14:
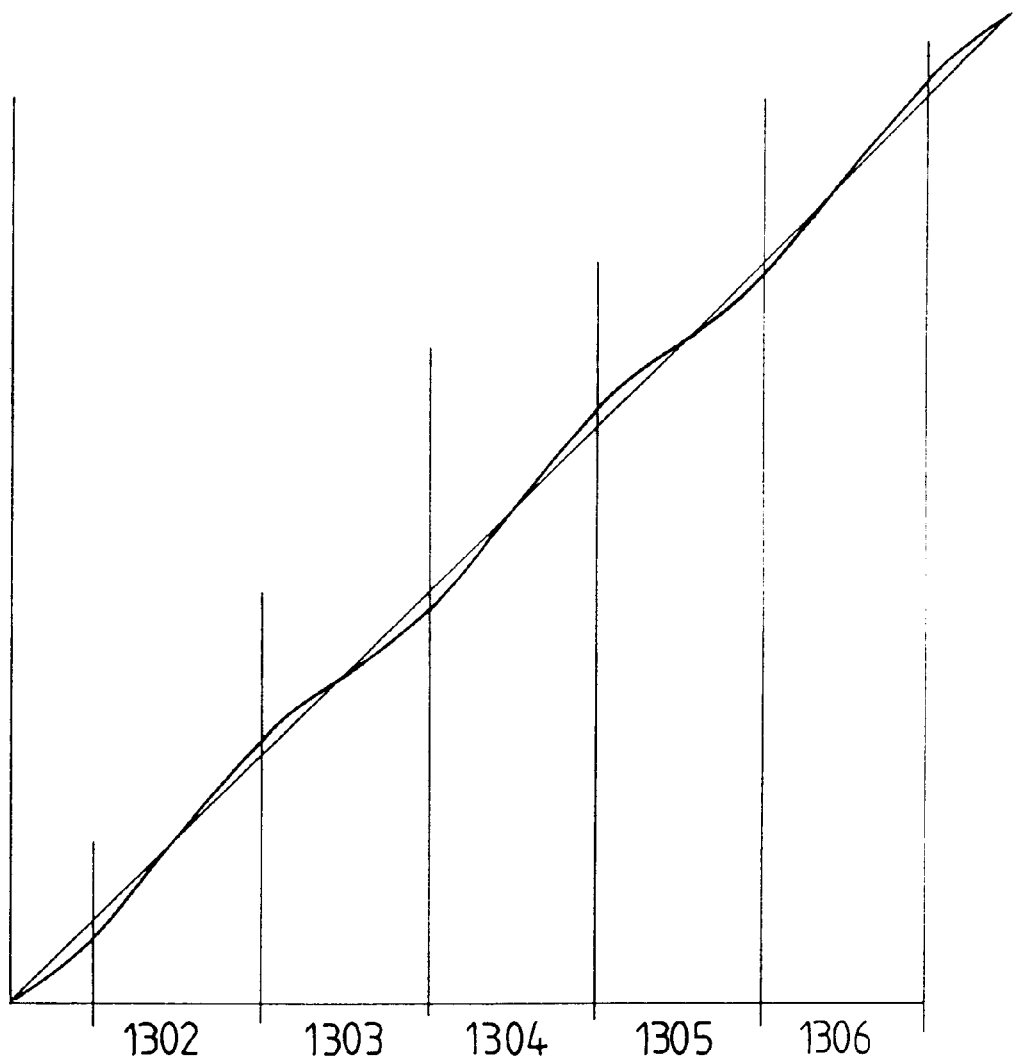
FIG. 12b is a diagram of a primary encoder signal similar to one of the signals of FIG. 11, this signal having a large deviation from a sinus shape.

In FIG. 12b a diagram is shown illustrating a sinusoidal-triangular signal shape that is far from the sinus shape normally assumed for encoder multiplication devices. To obtain a high linearity, also signals much closer to a sinus signal must be normalised.

Figure 13A:
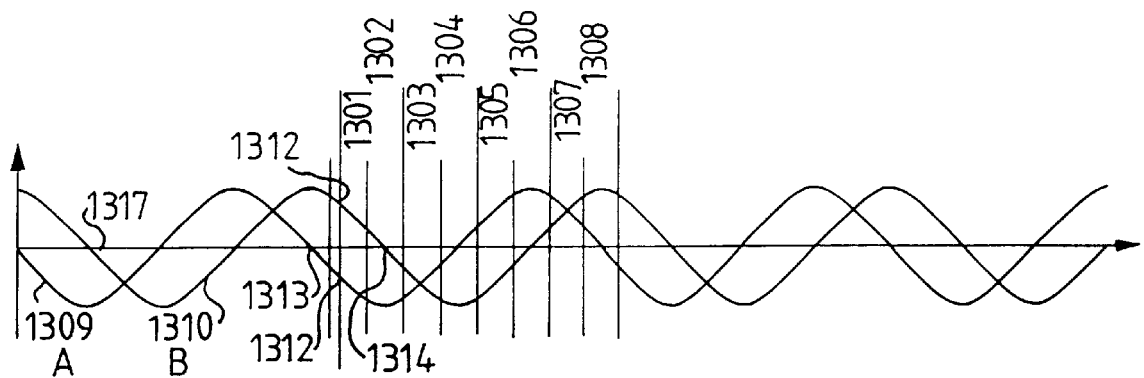
FIGS. 13a and 13b are diagrams of two primary encoder signals having a sinusoidal-triangular shape, the diagrams illustrating an algorithm for shaping the primary encoder signals, the diagram of FIG. 13b corresponding to a small portion of the diagram of FIG. 13a, FIG. 14 is a diagram illustrating a way to detect errors in coefficients of the algorithm illustrated in FIGS. 13a and 13b.
Figure 13B:
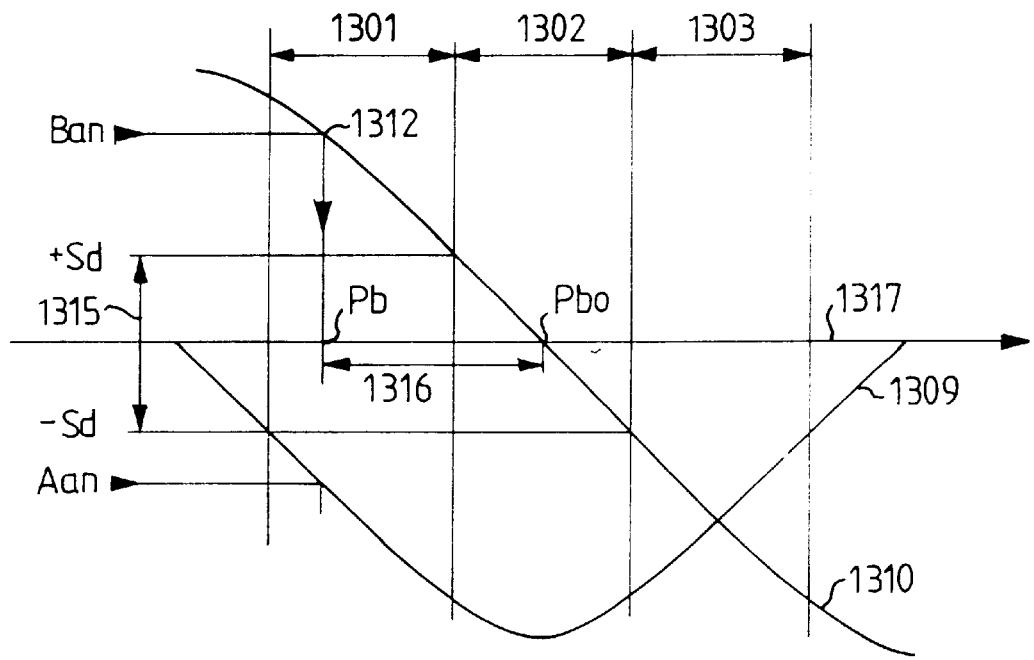

The diagrams of FIGS. 13a and 13b illustrate an algorithm handling a primary encoder signal like the one illustrated in FIG. 12b. The curve or signal form shown in FIGS. 13a and 13b has already been processed so that wobbling phenomena as that illustrated by the signals shown in FIG. 12a have been eliminated. The signals illustrated by the curves 1309 (A) and 1310 (B) therefore have approximately constant amplitude and are approximately centred around a zero line 1317.

The sinusoidal-triangular shape of the illustrated signals is rather triangular or linear in the regions close to the zero axis 1317 as shown in FIG. 13b, where a segment of primarily the signal 1310 is shown in a larger scale.

A linearisation algorithm for transforming the known values from the AD-converters like 809 and 810 to a position value will now be described. The primary AD data $A_{an}$ (to be read as the normalised analog value of channel A) and $B_{an}$ shown in FIG. 13 as points 1311 and 1312 have already been normalised against wobbling and offset.

The data processing of one signal period is performed differently for eight, equally wide time sectors shown at 1301–1308, each sector thus representing 45° of the signals. If the sampled value $A_{an}$ is within the interval of $+S_d$ to $-S_d$ shown at 1315, which is centered around the zero axis 1317, the position is assumed to be in an interval like 1304 or 1308. For a 1024 line encoder there are 2048 different sectors like 1304 and 1308, and latched data from the counter chain like 911 of FIG. 9 will indicate the sector from which the sampled data value is obtained. If the sampled value $B_{an}$ is within the interval of $+S_d$ to $-S_d$, the position is assumed to be in an interval like 1302 or 1306. In the case shown neither of these conditions apply. The sampled value $B_{an}$ is more positive than the upper limit $+S_d$ of the interval and the sampled value $A_{an}$ is more negative than the lower limit $-S_d$. The sample must be therefore be taken from a sector 1301, and again a counter like 911 will indicate from which of the 1024 sectors of type 1301 the sample is taken.

In the algorithm described, the two sampled signals $A_{an}$ and $B_{bn}$ (the values 1311 and 1312) are processed by a linearisation algorithm that basically corresponds to taking the sampled data value like $B_{an}$ (to be read as the normalised analog value of the signal of channel B) and finding the distance or time length period 1316 from the intersection point between curve B and the zero line 1317. As the position $P_{b0}$ of the zero crossing point 1314 of curve B is known, the desired position $P_b$ can be obtained as position the $P_{b0}$ subtracted by the distance 1316:

$$P_b=P_{b0}-(k_{b1}B_{an}+k_{b2}B_{an}^2+k_{b3}B_{an}^3\ldots)$$

where the number of terms required depends on the shape of curve 1310. As curve 1310 is almost linear in the sections 1301–1303, very few terms are required.

Signal processors are well suited to rapidly evaluate polynomials like the one above.

In a similar way, the position $P_a$ can be obtained from the value $A_{an}$, some coefficients $k_{a1}$ to $k_{an}$ and a known value of the position $P_{a0}$, and the position $P_a$ obtained should be very similar to the position $P_b$ in sections 1301, 1303, 1305 and 1307.

In sections 1302 and 1306 $P_a$ is likely to be unreliable, and in sections 1304 and 1308 $P_b$ is likely to be unreliable. The algorithm described uses $P_a$ as the position for samples in sections 1304 and 1308 and uses $P_b$ for sections 1302 and 1306. For the section 1301 shown in the Figure, both $P_a$ and $P_b$ are calculated. The positions thus obtained are added to each other in a way that gives more weight to the channel with the shortest distance like 1316 as the position estimate $P_b$ is more reliable in the right part of section 1301 and the position estimate $P_a$ is more reliable in the left part of section 1301. One such algorithm is $$P=((A_{an}+S_d)^2 P_b+(B_{an}-S_d)^2 P_a)/((A_{an}+S_d)^2+(B_{an}-S_d)^2)$$

At the border between section 1301 and 1302, $B_{an}=S_d$ and the expression above becomes $$P=((A_{an}+S_d)^2 P_b)/((A_{an}+S_d)^2)=P_b$$

which is the same as the expression for the position in section 1302.

At low speeds, the speed is obtained as the difference between two neighbouring positions. It is therefore important that two positions close to each other are not calculated using expressions that gives discontinuities in position estimates. Two positions very close to each other but located on different sides of the border between sections 1301 and 1302 will with the expression used obtain values that are very close to $P_b$ (for section 1301) and identical to $P_b$ (for section 1302).

If a high precision is required, the position for each of the 2048 values $P_{a0}$ and $P_{b0}$ for a full turn of a 1024 line encoder can be calibrated, for example after assembly against a known precise reference. For a linear encoder, a laser interferometer could be used a reference. The calibration data can be retrieved from a table or can be calculated from an expression using constants obtained by processing of calibration data.

If only high resolution is required, the position $P_{a0}$ can be assumed to be an integer given by a counter like 911, and the position $P_{b0}$ can be taken to be $P_{a0}+k_{ab}$, the latter constant being approximately 1 for transducers producing signals having a phase difference close to 90°.

The coefficients like $k_{a1}, \ldots, k_{bn}$ can be constant for all periods of the primary signal, may be taken from a table using data from the position counter like 911 as index or may be evaluated using polynomials based on the encoder axis angle like the expression described with reference to FIG. 12a.

In FIG. 14 a diagram is shown of the estimated position (vertical axis) as a function of the angular movement or position (horizontal axis). The diagram illustrates the effect of an error in the coefficients in the expressions for $P_a$ and $P_b$. The straight inclined line gives the correct estimates and the "wavy" curve illustrates a case, where the coefficients $k_{a1}$ and $k_{b1}$ are too large, thus giving too high inclination for the $P_a$ estimate shown in section 1304 of FIG. 13a and for the $P_b$ estimate shown in sections 1302 and 1306. Such an error could result from drift of optical components giving more light than expected. This error is easily detected. Other coefficient errors can be detected in similar ways, thus permitting corrections to be executed during even after a calibration. For some error types corrections can also be made with the motor installed in the end-user equipment. Such test runs can be made by the controller when required, for example after machine system reset or during a weekly check-up cycle.

The diagram of FIG. 12a shows amplitudes varying due to wobbling. Other deviations can also be handled by an initial calibration. Reduction in encoder disc transparency can also be tested during a periodic slow check-up movement, in which the amplitudes of the signals on the two channels 801 and 802 are checked against the amplitudes expected. Deviations can be stored as an angle dependent correction gain constant table.

In the embodiments shown, the asynchronous binary position signal that drives the position counter has four states for every period of the basic encoder signal. It is sometimes preferable to use a conventional pulse multiplication scheme to obtain for example 16 or 20 states for every period of the basic encoder signal. This permits the use of a low line count encoder disk or ruler, still permitting the transfer of a higher resolution two phase signal to external devices like a NC system controller or a PLC system, but requires that the primary signal is close to sinusoidal.

Figure 15:
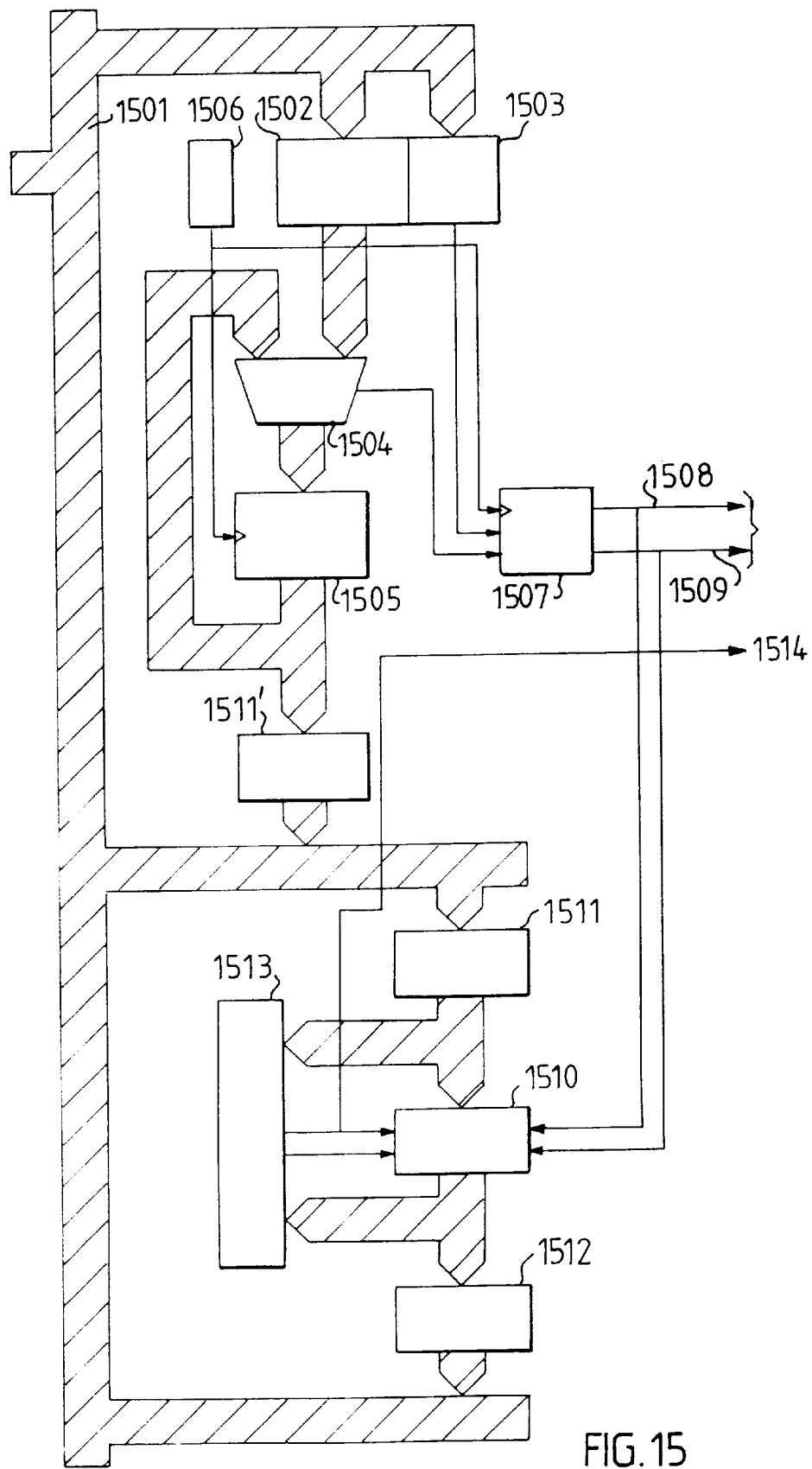
FIG. 15 is a block diagram of an encoder signal generator and FIG. 16 is a block diagram of an alternative embodiment of an encoder signal generator.

In FIG. 15 a block diagram of an encoder signal generator interface unit is shown, to be used for converting the data from the transducer disclosed above to an output signal corresponding to that of a digital output incremental encoder.

In many applications there is a demand for asynchronous position information with a high resolution. Multi-axis controllers are traditionally designed to receive position information from devices like digital output incremental encoders. In a multi-axis servo system, it is for example possible that some of the axes have a digital motor controller using a transducer like the one described above. The information obtained from the transducer has a very high resolution but is only available for discrete time points for which the analog values have been sampled. This is completely sufficient for the motor controller like the one shown in FIG. 9 but not sufficient for a traditional multi-axis controller. Multi-axis system controllers used in various machine systems available on the marketplace today are often using control communication signals developed to fit servo motor controllers based on analog control inside the servo motor driver. In many cases, the servo motor drivers do actually use a fully digital or partially digital, partially analog control structure. Therefore, the communication between the multi-axis system controller and the servo motor driver could in theory be done using a digital data link. Even if these controllers can be equipped with a data link for digital position input, the control interval may however be different. The multiaxis controller may use a 333 μs control interval while the motor controller may use a 100 μs interval.

The large number of suppliers that are compatible with the interfaces designed for analog servo motor drivers and the lack of commonly accepted interface standards have in combination with the large investments made in already existing multi-axis system controllers caused many users of multi-axis servo controllers the keep the interfaces designed for analog servo motor drivers.

Thus, in an encoder signal generator illustrated in the block diagram of FIG. 15 a servo motor driver processor like that shown at 908 in FIG. 9 but not shown in this Figure, can access various registers in the encoder signal generator through a data bus 1501. The computer gets precise information on the position and/or speed of the motor shaft at regular intervals.

By entering a fractional value, i.e. less than 1, into the register 1502 and by indicating up or down direction into a register 1503, the computer can create almost equidistant carry pulse outputs from an adder 1504. The adder 1504 adds the output from register 1502 to a former sum that is stored in register 1505. Every clock pulse from the oscillator 1506 will cause the sum to change. When a carry is obtained in the addition operation in the adder 1504, it is fed to a circuit 1507 which will change the states of its two output terminals 1508, 1509 in a way that will be interpreted either as a incremented or decremented position by some multi-axis controller, not shown, reading the output signals on these terminals. For example, the output sequence 11→01 (output 1508 goes from a high to a low level while output 1509 remains high) may be interpreted as an incremented position while output sequence 11→10 will be interpreted as a decremented position.

An example can illustrate the operation. Assume that the registers handle values comprising 2 decimal digits. If the increment/decrement register 1502 holds a data value=35, the sum register 1505 holds data=85 and the states on both outputs 1508 and 1509 are equal to 1, i.e. have a high level, consecutive clock pulses from the oscillator 1506 will produce the following sequence:

TABLE 1

| | Register 1505 | | | | | | | | | | | | |
|---|---|---|---|---|---|---|---|---|---|---|---|---|---|
| | 85 | 20 | 55 | 90 | 25 | 60 | 95 | 30 | 65 | 00 | 35 | 70 | 05 |
| Carry | 1 | 0 | 0 | 1 | 0 | 0 | 1 | 0 | 1 | 0 | 0 | 1 | 0 |
| Output 1508 | 1 | 0 | 0 | 0 | 0 | 0 | 0 | 1 | 1 | 1 | 1 | 1 | 0 |
| Output 1509 | 1 | 1 | 1 | 1 | 0 | 0 | 0 | 0 | 0 | 1 | I | 1 | 1 |

While register 1505 holds 85 and register 1502 holds 35, the adder 1504 will give 20 and a carry (it cannot give 120 as it only has place for 2 decimal digits). The advantage of using an adder in place of a reloadable counter is that the resolution is higher. A reloadable counter gives a carry for every n clock pulses. For 100 clock pulses, a reloadable counter gives either 100/3=33 carry pulses or 100/2=50 carry pulses while the adder circuit shown can give any number between 33 and 50, in the case shown 35 pulses.

A reloadable counter is however to be preferred compared to the construction for which a selection is made among a set of clock sources having relative factors of 2 for the clock frequencies thereof and which is disclosed in the European patent application EP-A1 0 414 953. Applied to the example above and limited to the range 100–1, this would give the frequency alternatives 100 (=100/1), 50, 25, 12.5, 6.25, . . . , 1.56 (=100/64), etc., while a reloadable counter can give the alternatives 100 (=100/1), 50, 33.3, 25, 20, 16.7, 14.3, 12.5 . . . . 1.01 (=100/99) compared to the adder solution of FIG. 15 which can give any value from 99 to 1.

With presently available digital circuits, a suitable frequency for the oscillator 1506 is in the magnitude of order of 20 MHz. The multi-axis controllers that are to read the signals 1508 and 1509 in an encoder format are rarely designed to accept higher frequencies that 250 kHz. As four carries are necessary for one complete cycle of either one of the signals on the output lines 1508 and 1509, this represents a carry frequency of 4×250 kHz or 1 MHz. Using a 20 MHz clock oscillator 1506, this requires at most one carry for every 20 clock pulses. A width of 8 bits for registers 1502 and 12 bits for register 1505 and of adder 1504 then seem to be sufficient for most applications. If the computer driving data bus 1501 updates the system registers once every 100 µs, data=1 in the increment/decrement register 1502 will cause 1 or 0 carry during the updating interval (2000 additions of 1 to a 12 bit accumulator). Register 1502 data=255 will cause 20 MHz×255/4096×100 µs=124 or 125 carries per 100 µs, giving an effective count frequency of 1.245 MHz and an output frequency of 311 kHz. The time between two output changes will be one of 800 or 850 ns, thus giving a quotient between high and low output signals that is close to 50%.

The circuit 1507 will change the signal level on the output pair 1508, 1509 depending on the carries described above and on the up/down information given by register 1503. The table 1 above illustrates a count up case producing an output pulse sequence 11→01→00→10→ . . . ; the table 2 below illustrates a count down case producing outputs sequence 11→10→00→01→ . . . . Assume as above that the registers handle values of 2 decimal digits, register 1502 holds data=35, register 1505 initially holds data=85 and that the levels on both outputs 1508 and 1509 are initially equal to 1, consecutive clock pulses from the oscillator 1506 will give the following sequence:

TABLE 2

| | Register 1505 | | | | | | | | | | | | |
|---|---|---|---|---|---|---|---|---|---|---|---|---|---|
| | 85 | 20 | 55 | 90 | 25 | 60 | 95 | 30 | 65 | 00 | 35 | 70 | 05 |
| Carry | 1 | 0 | 0 | 1 | 0 | 0 | 1 | 0 | 1 | 0 | 0 | 1 | 0 |
| Output 1508 | 1 | 1 | 1 | 1 | 0 | 0 | 0 | 0 | 0 | 1 | 1 | 1 | 1 |
| Output 1509 | 1 | 0 | 0 | 0 | 0 | 0 | 0 | 1 | 1 | 1 | 1 | 1 | 0 |

In the count down case shown in table 2, a carry will initiate a state change in the signals on the output lines 1508, 1509. The register 1502 should then be loaded with small values for slow motions. This eliminates the risk of very short times state combinations on the outputs 1508 and 1509. Alternatively, table 3 shows an embodiment where the lack of carry does initiate a state change in the signal on the outputs 1508, 1509. A slow motion requires in this case a large value in the register 1502, and the up/down register 1503 can be replaced with the Most Significant Bit of the register 1502.

TABLE 3

| | Register 5 | | | | | | | | | | | | |
|---|---|---|---|---|---|---|---|---|---|---|---|---|---|
| | 85 | 50 | 15 | 80 | 45 | 10 | 75 | 40 | 5 | 70 | 35 | 0 | 65 |
| Carry | 1 | 1 | 1 | 0 | 1 | 1 | 0 | 1 | 1 | 0 | 1 | 1 | 0 |
| Output 8 | 1 | 1 | 1 | 1 | 1 | 1 | 1 | 1 | 0 | 0 | 0 | 0 | 0 |
| Output 9 | 1 | 1 | 1 | 1 | 0 | 0 | 0 | 0 | 0 | 0 | 1 | 1 | 1 |

Some optional extra registers are shown in the block diagram of FIG. 15. To permit an easier algorithm in the servo motor driver processor driving the data bus 1501, the encoder pulses delivered on the output terminals 1508 and 1509 can be decoded into a position using an internal quadrature counter 1510. (It is however possible to calculate the reported position based on an algorithm that utilises data earlier issued to the registers). By storing the output of the quadrature counter 1510 in the register 1512 at the same time as the real axis position and/or speed is sampled by the position transducer used by the servo motor driver processor, the processor can calculate the deviation between the real position and the integer position reported by the encoder signal generator. If the value of the accumulator register 1505 is sampled into the register 1511' at the same time as the real axis position and/or speed is sampled by the position transducer used by the servo motor driver processor, a fractional value of the integer position reported by the encoder signal generator can be obtained.

The position reported by the encoder signal generator can thus be calculated by the servo motor driver processor. Using the highly accurate position and speed information available to the processor from its own transducers and by estimating the action of the torque on the shaft from the motor controller and external forces, the position of the shaft at the end of the next (future) control interval can be estimated. By loading a suitable value to the registers 1502 and 1503, the encoder signal generator can be set to deliver a pulse train on the output terminals 1508 and 1509 that will cause the reported position to coincide with the estimated future position.

Assuming a deviation between real and anticipated shaft acceleration of 1000 rad/s$^2$, the resulting position error after 100 $\mu$s is 0.5×1000×0.0001×0.0001=0.000005 radians= 0.0000007 revolutions. If the encoder signal generator simulates a 5000 periods/rev encoder (giving 20000 position events/rev), an error of 0.0000007 revolutions corresponds to 20000×0.0000007=0.014 position events on the encoder output.

An optional comparator 1513 can be used to give signals when the value of the up/down counter holds a value equal to 0 or equal to that stored in a register 1511. This register 1511 should be loaded with a value that is 4 times the number of periods per revolution that the encoder signal generator is to simulate. For example, if the multi-axis controller requires signals that simulates a 5000 periods/rev encoder, the register 1511 should be loaded with 19999. The quadrature counter 1510 should use the inputs from the comparator 1513 to load end limit data in place of incrementing/decrementing. Using the previous example, a count up event on the outputs 1508 and 1509 should increment the counter 1510 except when the counter value is 19999 in which case the counter should load 00000. In the same way, a count down event on the outputs 1508 and 1509 should decrement the counter 1510 except when the counter value is 00000 in which case the counter should load 19999 from the register 1511.

The output from the comparator 1513 that indicates that counter 1510 data equals 00000 can be delivered out of the system on an output line 1514 in order to simulate the zero pulse often available on incremental encoders.

The encoder signal generator illustrated in FIG. 15 thus permits an accurate simulation of the signals that would have been sent by an optical incremental encoder placed on the servo motor shaft. This simulation will be accurate even in cases where the signals available to the servo motor driver only gives position and/or speed data for some discrete time points, for example once every 100 $\mu$s. The simulated encoders number of periods/rev can be set by software (by a suitable scaling of data loaded into the register 1502) and the system also accepts quarter periods like 3333.25 periods/ rev (being a much better approximation of 10000/3 than 3333.00). For integer values of the number of periods/rev, a zero pulse can be accurately simulated. The phase difference between the two output channels can be kept close to 90°.

Figure 16:
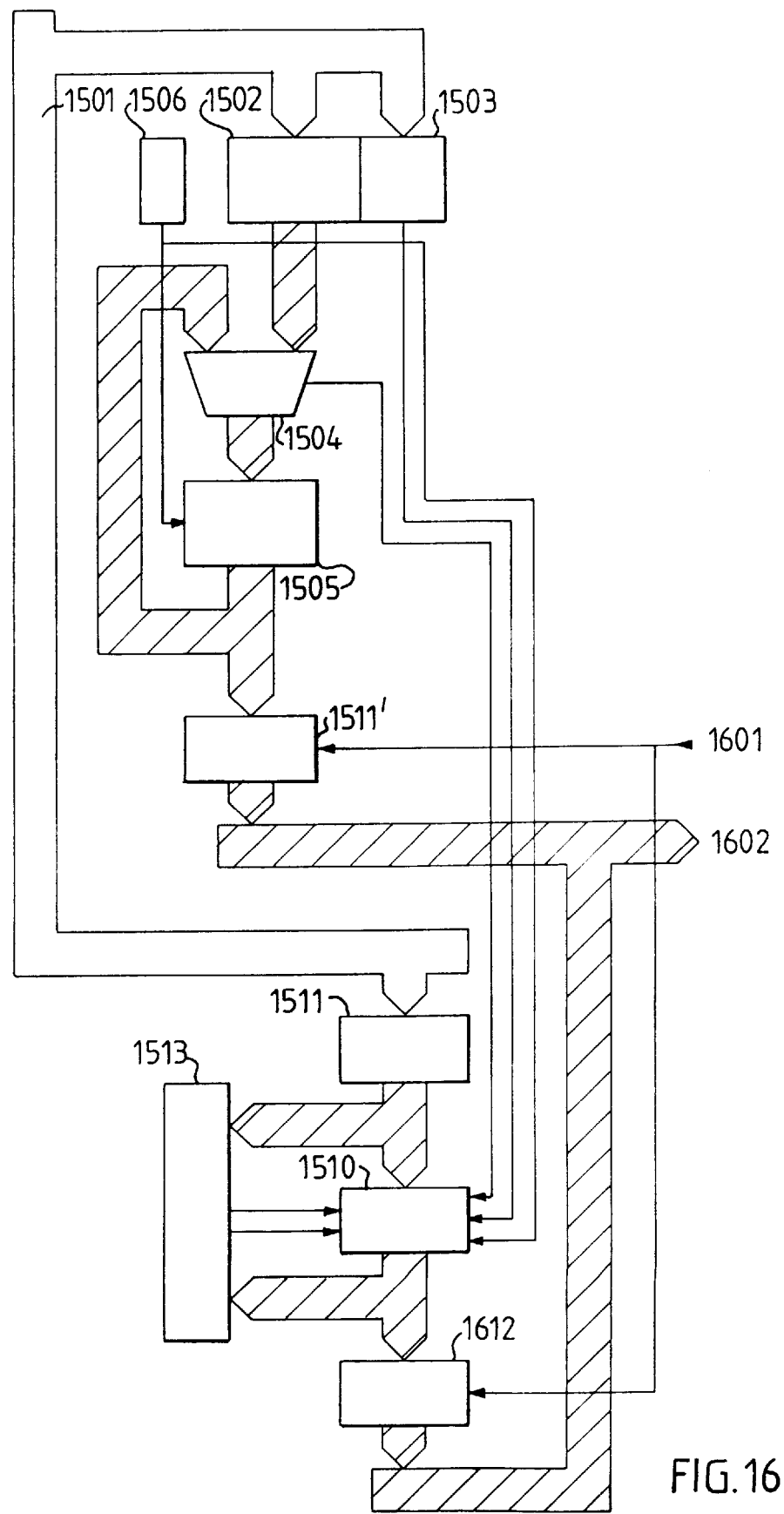

In the block diagram of FIG. 16 another version of the same basic concept of generating continuous position information from position information that is available only for some (normally equidistant) times. The registers 1511' and 1512 are there connected to a data bus connected to another data bus 1602 which is connected to another processor. A latching command on a line 1601 from the other processor latches data at times which are different from the control times of the motor control processor. The other processor can for example be a multi-axes controller or a communication processor that sends data to some other part of the system.

The position transducers as described above permit transducers, that are basically insensitive to bearing play and slow drift of the optical system components like lamps, LED's and encoder disc containation while giving an extremely high position and speed resolution. When integrated at the motor rotor, they also give very compact encoders with an extremely high resonance frequency. They are therefore very well suited to high gain, extremely stiff servo applications.

I claim:

1. A position transducer built into an electric motor, the position transducer comprising:

a transducer part having electronic circuits for control of the transducer part and/or for receiving signals from the transducer part and/or arranged to process the signals;

at least some of the electronic circuits being mounted to be coupled to a first thermal path having a first low thermal impedance, said first thermal path leading to a heat conductive part which is in contact with or closely adjacent to ambient air; and wherein the heat conductive part is also coupled to parts of the motor which are normally hot when the motor is in operation, the heat conductive part being coupled to the motor through a second thermal path having a second thermal impedance, said second thermal impedance being of higher value than the first low thermal impedance of the first thermal path so that heat can be conducted away from the at least some electronic circuit through the first thermal path to the heat conductive part to be dissipated to the ambient air and the second thermal impedance helps reduce any heat from the motor being conducted to the heat conductive part.

2. The position transducer of claim 1, wherein the heat conductive part comprises a metal lid arranged at one side of a cavity in which the electronic circuits are mounted.

3. The position transducer of claim 1, wherein the heat conductive part is attached to the motor only at a marginal portion of the heat conductive part, the marginal portion having a reduced thickness in relation to a center portion of the heat conductive part in order to form said second thermal path.

4. The position transducer of claim 1, further comprising a thermal shield having a poor thermal conduction and arranged at a side of a cavity opposite to a side where the electronic circuits are mounted in order to thermally isolate the electronic circuits from the motor.

5. The position transducer of claim 1, further comprising cooling fins attached to an exterior surface of the heat conductive part in contact with ambient air.

6. The position transducer of claim 1, further comprising a fan mounted on the motor and arranged direct an air stream to a surface of the heat conductive part for cooling the heat conductive part.

7. The position transducer of claim 1, wherein the second thermal path includes an air-gap and the heat conductive part is attached to the motor through said air-gap only through means having a small cross-sectional area to effectively restrict the flow of heat between the heat conductive part and the motor.

8. The position transducer of claim 7, wherein the means having a small cross-sectional area comprise screws.

9. The position transducer of claim 1, wherein the heat conductive part comprises a substantially flat lid closing one side of a cavity in which the electronic circuits are mounted, the lid being attached to the motor only through screws at a periphery of the lid and a seal being arranged at the periphery to keep the lid at a small distance from the motor in order to form said second thermal path.

10. The position transducer of claim 9, wherein the seal comprises an O-ring.

11. The position transducer of claim 1, wherein the electronic circuits comprise a circuit board and electronic components connected to the circuit board, the electronic components which generate a greatest amount of heat being substantially mounted at a rear side of the circuit board facing and being positioned adjacent an interior surface of the heat conductive part, the interior surface being opposite an exterior surface of the heat conductive part and the exterior surface being in contact with ambient air.

12. The position transducer of claim 11, further comprising an electrically isolating material having said first low thermal impedance and being arranged between the rear side of the circuit board in the interior side of the heat conductive part for forming part of the first thermal path.

13. The position transducer of claim 11, further comprising an electrically isolating material having said first low thermal impedance and being arranged between at least one electronic component on the rear side of the circuit board and the interior side of the heat conductive part for forming part of the first thermal path.

14. A position transducer built into an electric motor, the position transducer comprising:

a transducer part and electronic circuits for control of the transducer part and/or for receiving signals from the transducer part and/or arranged to process the signal, wherein at least some of the electronic circuits are mounted to be coupled to a first thermal path of low thermal impedance between the electronic circuits and a heat conductive part; and wherein said heat conductive part is only coupled to heat generating parts of the motor over a second thermal path having a second thermal impedance higher than the low thermal impedance of the first thermal path.

15. A position transducer for transducing movements built into an electric motor, wherein electronic circuits of the transducer are assembled having a low thermal impedance path coupling the electric circuits to a heat conductive part which is cooled by air from a fan mounted on the motor.

16. A position transducer for transducing movements built into an electric motor, wherein electronic circuits of the transducer are assembled having a low thermal impedance path coupling the electronic circuits to a heat conductive part which is cooled by a cooling liquid.

* * * * *